(12) United States Patent
Lee et al.

(10) Patent No.: US 12,501,419 B2
(45) Date of Patent: Dec. 16, 2025

(54) METHOD AND DEVICE FOR PERFORMING HARQ FEEDBACK IN NR V2X

(71) Applicant: LG Electronics Inc., Seoul (KR)

(72) Inventors: Seungmin Lee, Seoul (KR); Hanbyul Seo, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 749 days.

(21) Appl. No.: 17/607,338

(22) PCT Filed: Apr. 28, 2020

(86) PCT No.: PCT/KR2020/005635
§ 371 (c)(1),
(2) Date: Oct. 28, 2021

(87) PCT Pub. No.: WO2020/222514
PCT Pub. Date: Nov. 5, 2020

(65) Prior Publication Data
US 2022/0248425 A1 Aug. 4, 2022

Related U.S. Application Data

(60) Provisional application No. 62/982,051, filed on Feb. 26, 2020, provisional application No. 62/843,362,
(Continued)

(51) Int. Cl.
*H04W 72/1263* (2023.01)
*H04L 1/1812* (2023.01)
(Continued)

(52) U.S. Cl.
CPC ....... *H04W 72/1263* (2013.01); *H04L 1/1812* (2013.01); *H04L 5/0053* (2013.01); *H04W 72/20* (2023.01); *H04W 72/569* (2023.01)

(58) Field of Classification Search
CPC . H04W 72/00; H04W 72/1263; H04W 72/20; H04W 72/569; H04W 4/40;
(Continued)

(56) References Cited

U.S. PATENT DOCUMENTS

2020/0029318 A1* 1/2020 Guo ..................... H04W 76/11
2020/0205166 A1* 6/2020 Huang ................ H04W 68/005
(Continued)

FOREIGN PATENT DOCUMENTS

WO WO2018062857 4/2018
WO WO2019029652 2/2019

OTHER PUBLICATIONS

Huawei, HiSilicon, "Sidelink physical layer structure for NR V2X," R1-1903943, Presented at 3GPP TSG RAN WG1 Meeting #96bis, Xi'an, China, Apr. 8-12, 2019, 17 pages.
(Continued)

*Primary Examiner* — Chuong M Nguyen
(74) *Attorney, Agent, or Firm* — Fish & Richardson P.C.

(57) ABSTRACT

Proposed is a method for a first device to perform wireless communication. The method can include a step of: receiving a plurality of first physical sidelink control channels (PSCCHs) or a plurality of first physical sidelink shared channels (PSSCHs); determining the priorities of a plurality of first physical sidelink feedback channels (PSFCHs) related to either the plurality of first PSCCHs or the plurality of first PSSCHs; and transmitting a hybrid automatic repeat request (HARQ) feedback through at least one first PSFCH among the first plurality of the first PSFCHs on the basis of the priorities of the plurality of first PSFCHs.

13 Claims, 30 Drawing Sheets

Related U.S. Application Data filed on May 3, 2019, provisional application No. 62/842,500, filed on May 2, 2019, provisional application No. 62/839,744, filed on Apr. 28, 2019.

(51) Int. Cl.
  *H04L 5/00* (2006.01)
  *H04W 72/20* (2023.01)
  *H04W 72/566* (2023.01)

(58) Field of Classification Search
  CPC ....... H04L 5/00; H04L 1/1812; H04L 5/0053; H04L 5/0048; H04L 1/1825; H04L 5/0055; H04L 5/0064; H04L 1/1858
  See application file for complete search history.

(56) References Cited

U.S. PATENT DOCUMENTS

| | | | | |
|---|---|---|---|---|
| 2020/0228292 | A1* | 7/2020 | Nguyen | H04W 24/08 |
| 2020/0229171 | A1* | 7/2020 | Khoryaev | H04W 4/40 |
| 2020/0252910 | A1* | 8/2020 | Wu | H04W 72/04 |
| 2020/0322099 | A1* | 10/2020 | Park | H04W 72/20 |
| 2020/0351057 | A1* | 11/2020 | Yeo | H04L 1/1854 |
| 2021/0028910 | A1* | 1/2021 | Cheng | H04L 1/1854 |
| 2021/0105728 | A1* | 4/2021 | Nguyen | H04W 52/46 |
| 2021/0400681 | A1* | 12/2021 | Wang | H04W 72/02 |
| 2022/0303952 | A1* | 9/2022 | Hoang | H04L 5/0005 |

OTHER PUBLICATIONS

Qualcomm Incorporated, "QoS for NR V2X," R2-1905196 (was R2-1903043), Presented at 3GPP TSG-RAN WG2 Meeting #105bis, Xi'an, China, Apr. 8-12, 2019, 5 pages.

Samsung, "On Resource Allocation Mechanisms for NR V2X," R1-1901050, Presented at 3GPP TSG RAN WG1 Ad-Hoc Meeting 1901, Taipei, Taiwan, Jan. 21-25, 2019, 6 pages.

* cited by examiner (a)

(b)

(a)

(b)

: PSBCH OS

: S-PSS (i.e., different sequence for each S-PSS)

: S-SSS (i.e., same sequence for two S-PSS)

: GP (e.g., TX-RX switching time)

METHOD AND DEVICE FOR PERFORMING HARQ FEEDBACK IN NR V2X

CROSS-REFERENCE TO RELATED APPLICATIONS

This application is a National Stage application under 35 U.S.C. § 371 of International Application No. PCT/KR2020/005635, filed on Apr. 28, 2020, which claims the benefit of U.S. Provisional Application No. 62/839,744 filed on Apr. 28, 2019, U.S. Provisional Application No. 62/842,500, filed on May 2, 2019, U.S. Provisional Application No. 62/843,362, filed on May 3, 2019, and U.S. Provisional Application No. 62/982,051, filed on Feb. 26, 2020. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in a wireless communication system, when one physical sidelink feedback channel (PSFCH) slot in the resource pool is linked with a plurality of physical sidelink shared channel (PSSCH)/physical sidelink control channel (PSCCH) transmission slots and/or one PSFCH slot in the resource pool is received by frequency-division multiplexing (FDM) a plurality of PSSCH/PSCCH from different UEs through a plurality of sessions (e.g., unicast, groupcast), from a specific UE point of view, there may be a problem in that a plurality of PSFCH transmissions or PSFCH receptions on which FDM is performed must be performed simultaneously. For example, when one PSFCH slot is related with slots related to a plurality of PSSCH transmissions and/or slots related to a plurality of PSCCH transmissions, there may be a problem that the UE has to perform transmission/reception of a plurality of PSFCHs at the same time point. And/or, when the UE receives a plurality of PSSCHs/PSCCHs on which FDM is performed through a plurality of sessions (e.g., unicast, groupcast), there may be a problem that the UE has to perform transmission/reception of a plurality of PSFCHs at the same time point. A method of efficiently handling PSFCH transmission/reception is proposed through various embodiments of the present disclosure in the above-described circumstances.

Technical Solutions

In an embodiment, there is provided a method of performing wireless communication by a first device. The method may include receiving a plurality of first physical sidelink control channels (PSCCHs) or a plurality of first physical sidelink shared channels (PSSCHs) and determining priorities of a plurality of first physical sidelink feedback channels (PSFCHs) related to the plurality of first PSCCHs or the plurality of first PSSCHs and transmitting a hybrid automatic repeat request (HARQ) feedback through at least one first PSFCH among the plurality of first PSFCHs based on the priorities of the plurality of first PSFCHs.

Effects of the Disclosure

A UE may effectively perform sidelink communication.

DESCRIPTION OF EXEMPLARY EMBODIMENTS

Figure 1:
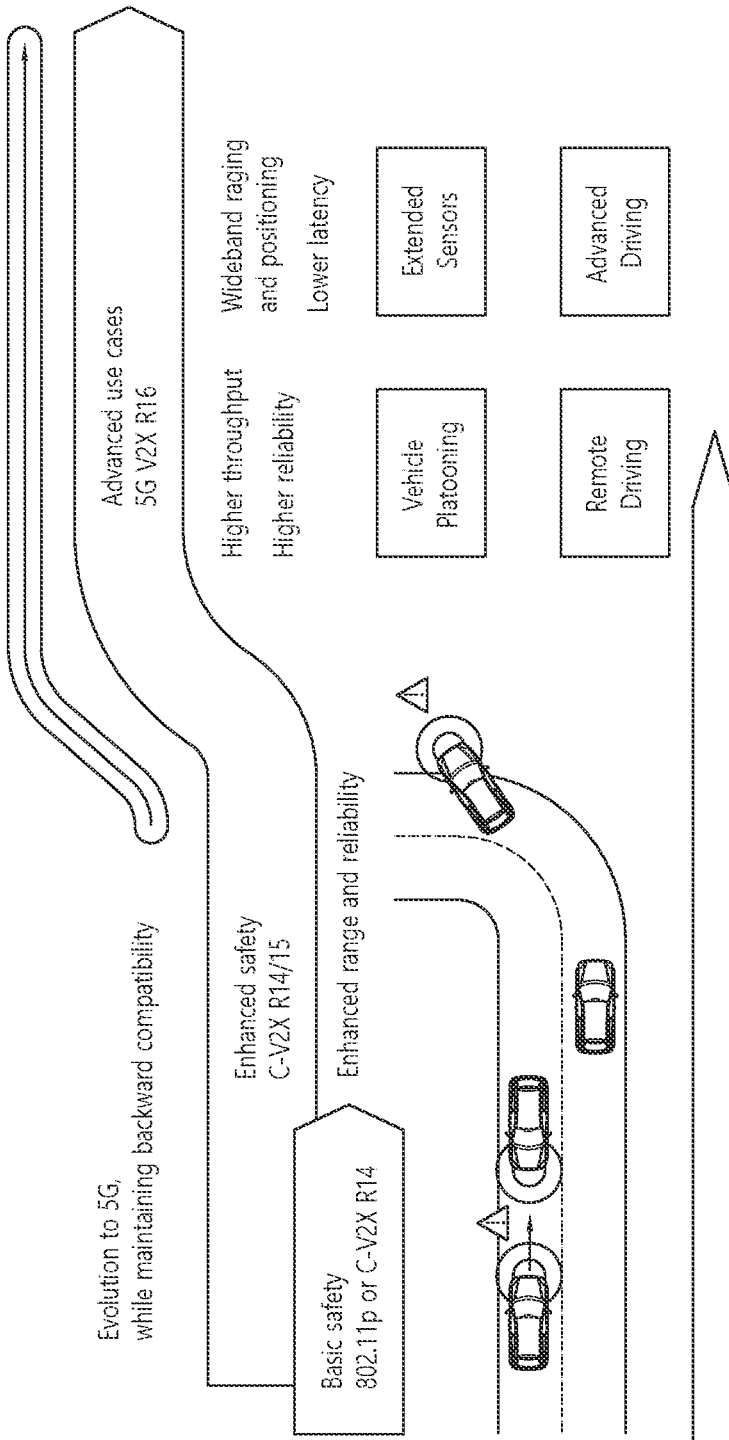
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
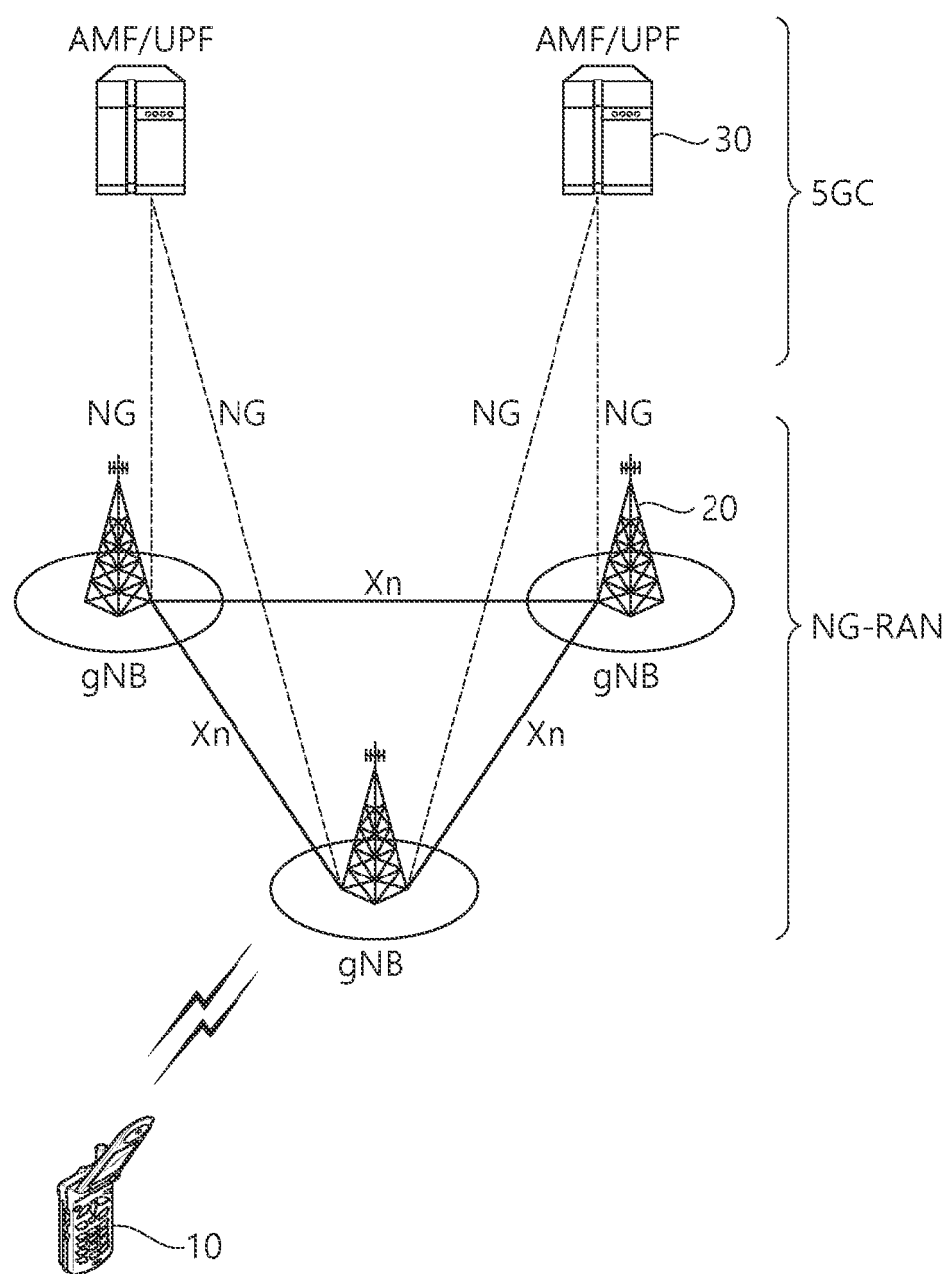
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
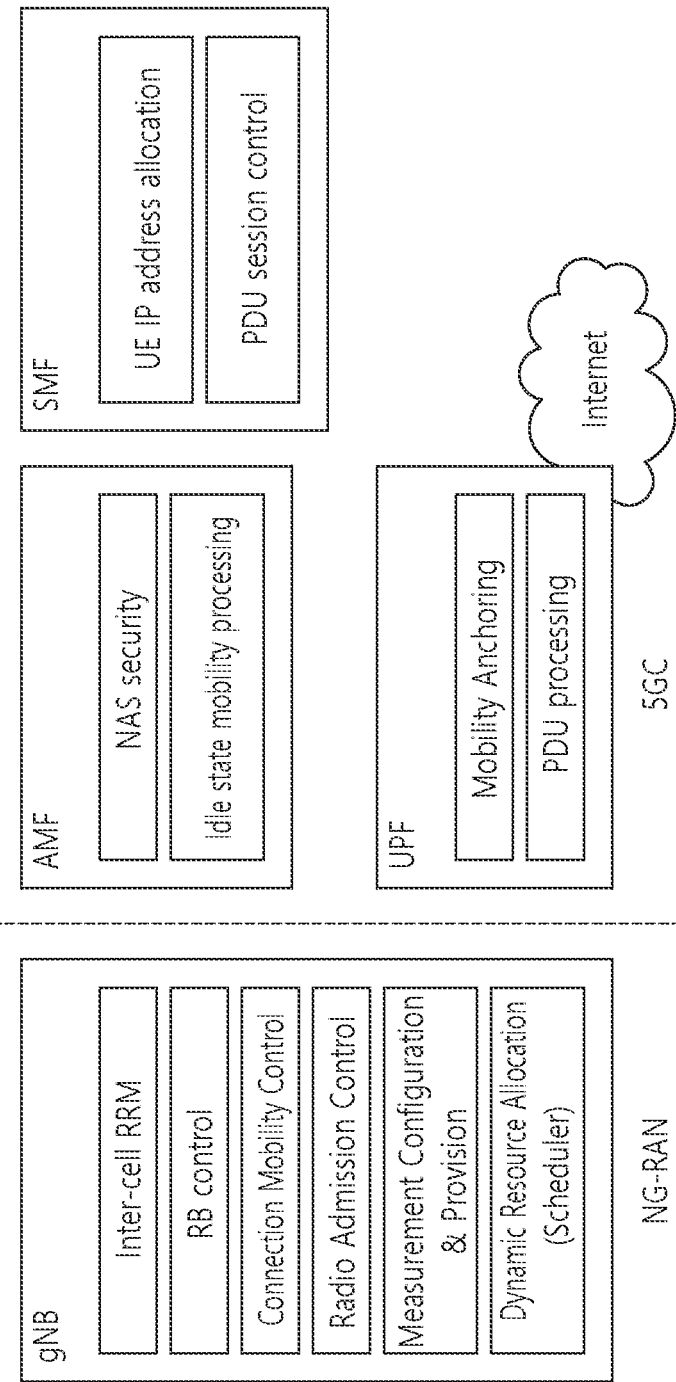
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
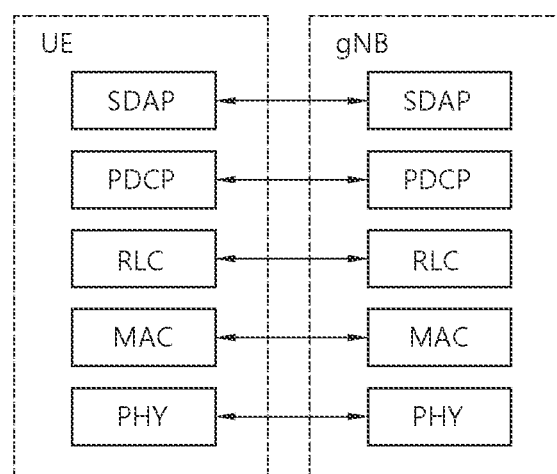
FIG. 4 shows a radio protocol architecture, in accordance with an embodiment of the present disclosure.
Figure 4:
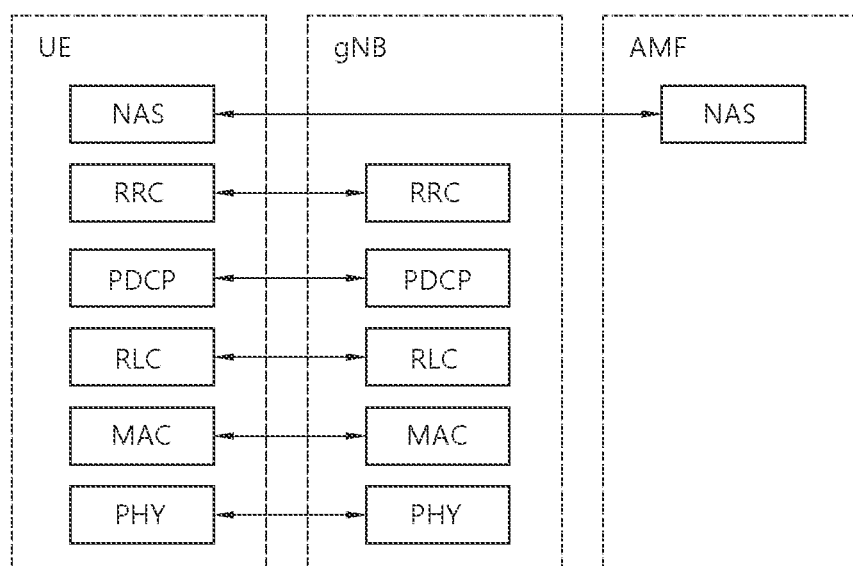

FIG. 4 shows a radio protocol architecture, in accordance with an embodiment of the present disclosure. The embodiment of FIG. 4 may be combined with various embodiments of the present disclosure. Specifically, FIG. 4($a$) shows a radio protocol architecture for a user plane, and FIG. 4($b$) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
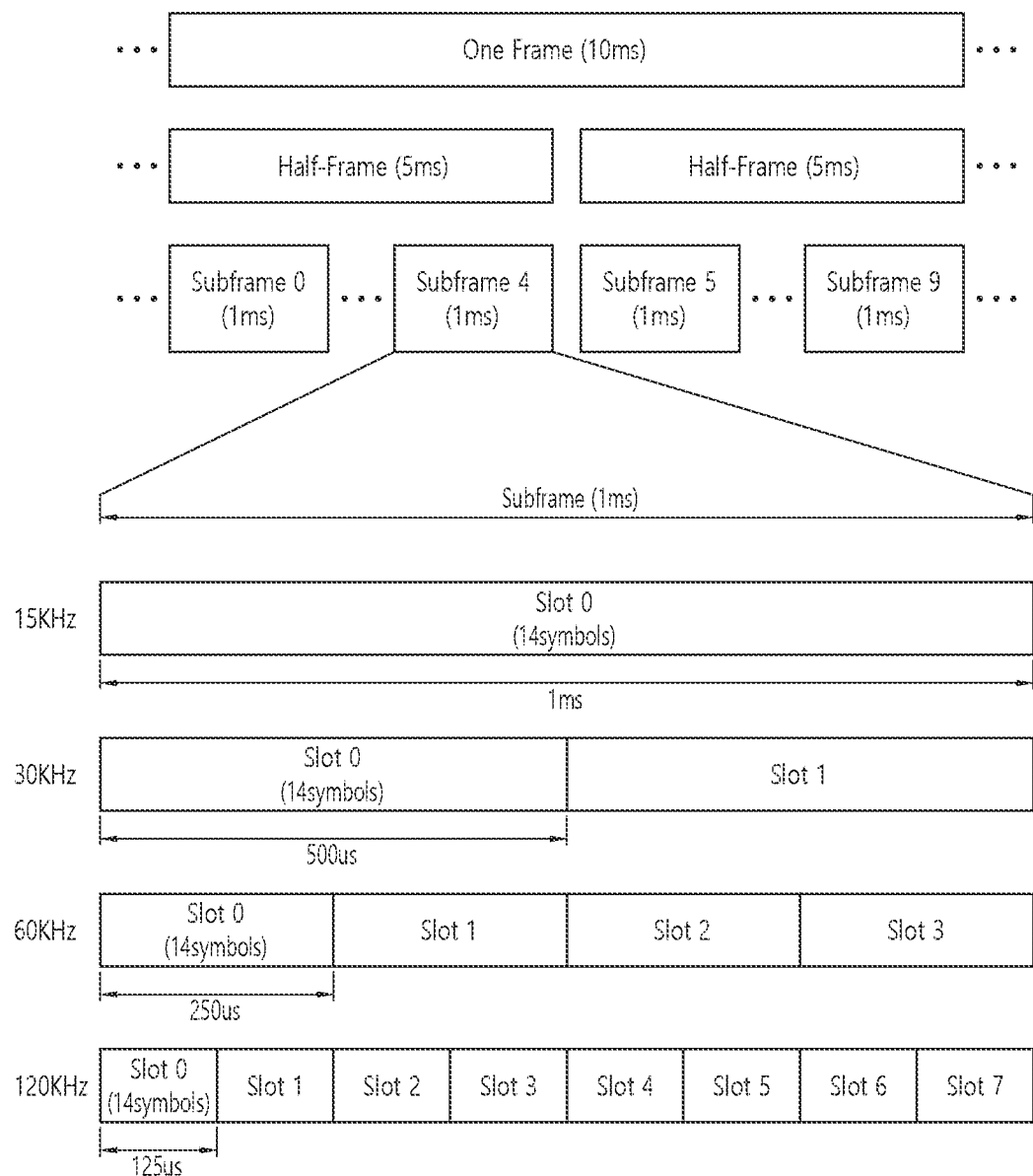
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$) a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
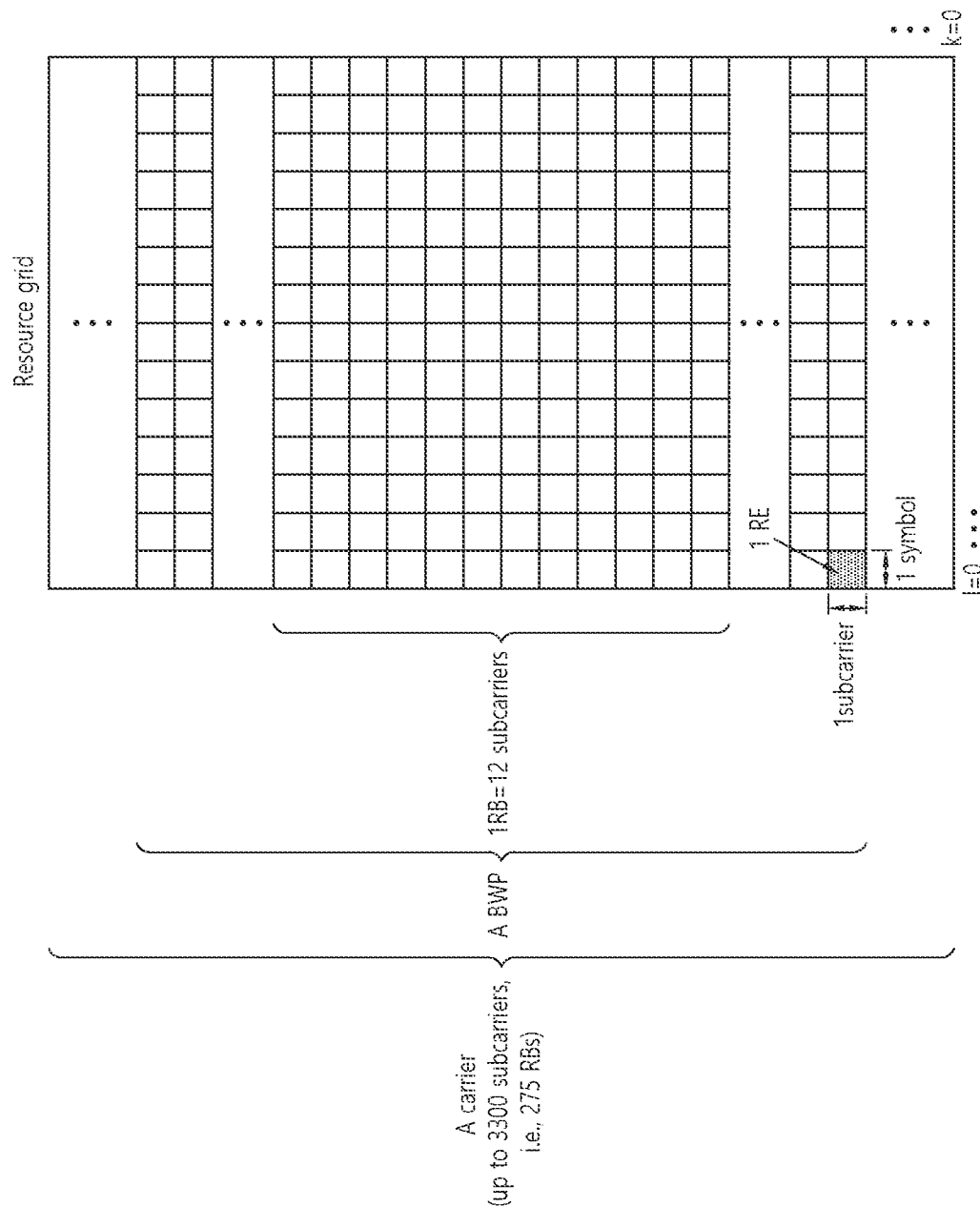
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
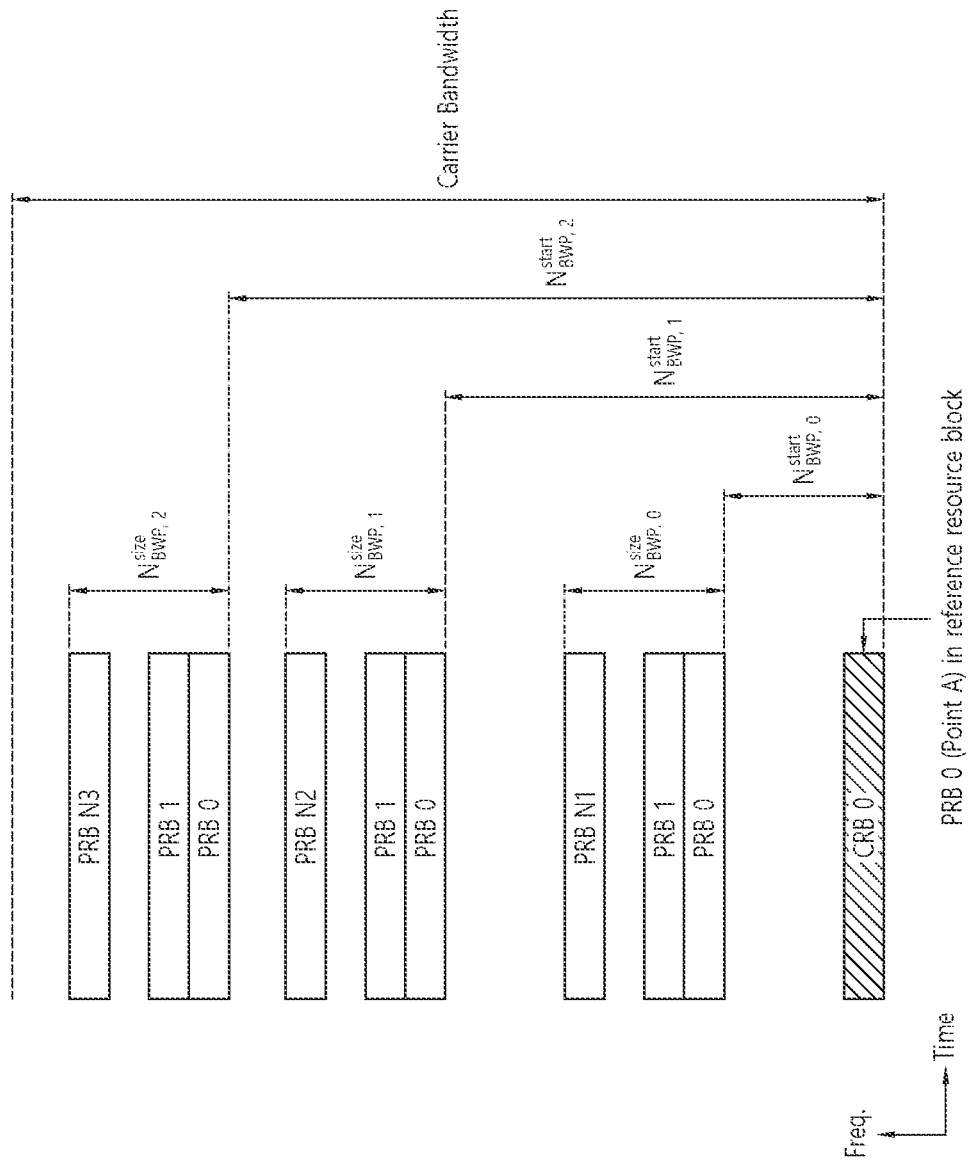
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
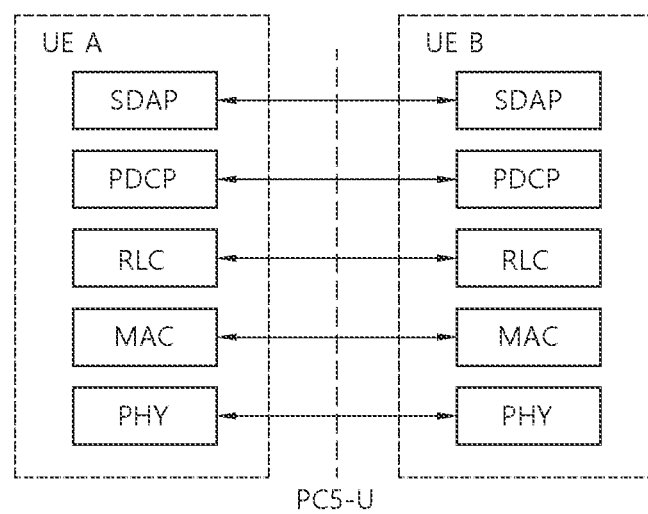
FIG. 8 shows a radio protocol architecture for a SL communication, in accordance with an embodiment of the present disclosure.
Figure 8:
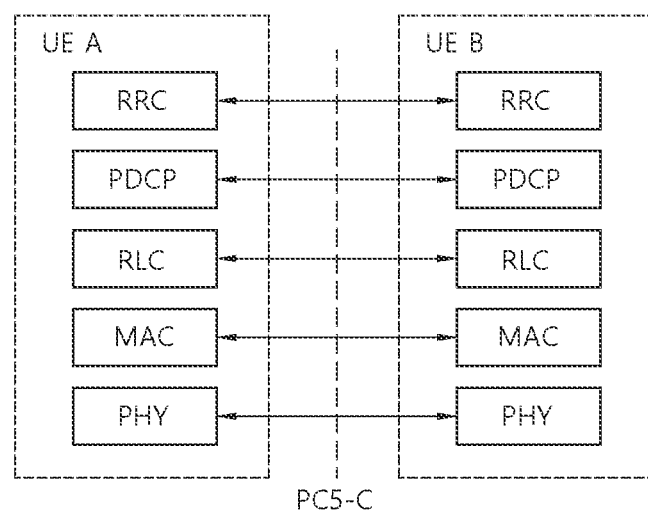

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
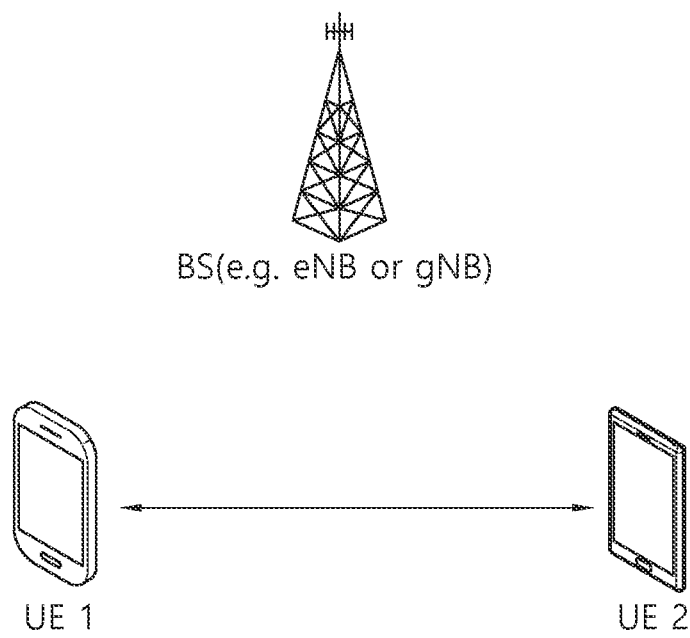
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
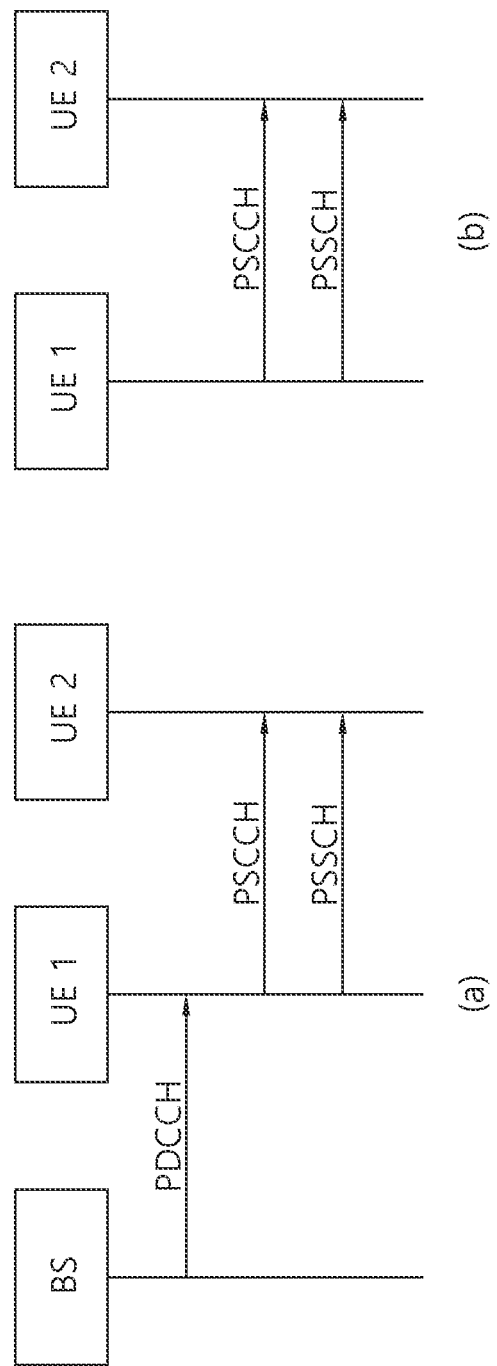
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI)

to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
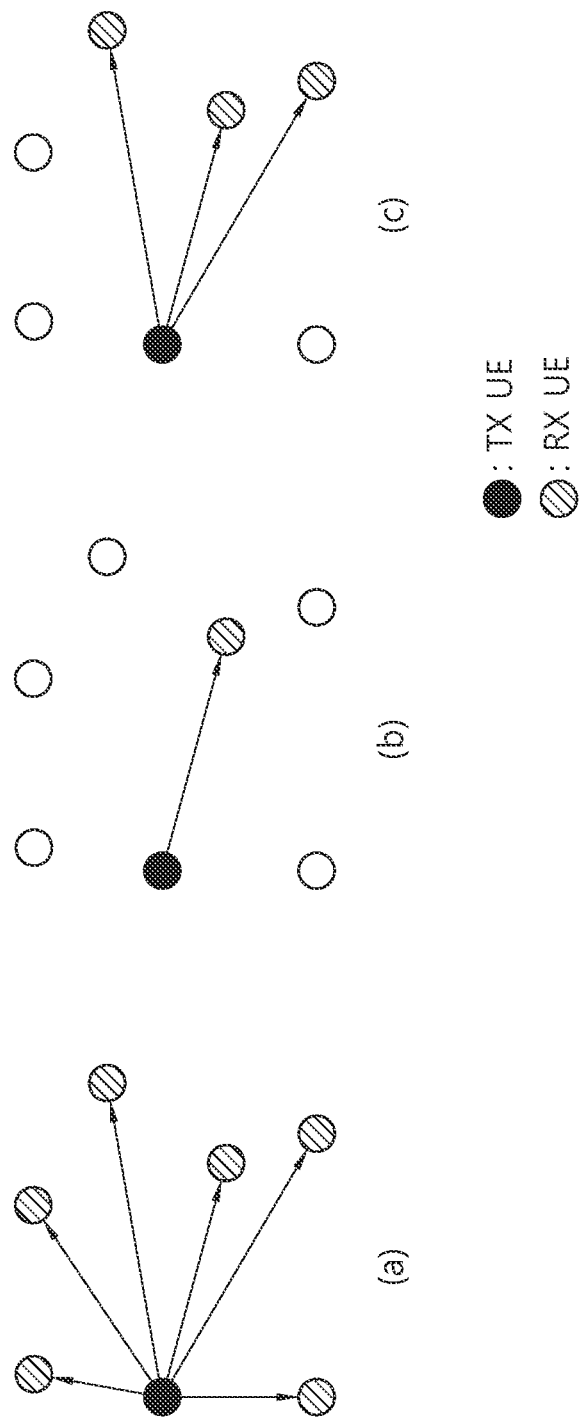
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

The SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

When the SL HARQ feedback may be enabled for groupcast, the UE may determine whether to transmit HARQ feedback based on a transmission-reception (TX-RX) distance and/or RSRP. In the non-CBG operation, two HARQ feedback options may be supported for groupcast.

(1) Option 1: After the receiving UE decodes a related PSCCH, if the receiving UE fails to decode the corresponding transport block, the receiving UE may transmit an HARQ-NACK over the PSFCH. Otherwise, the receiving UE may not transmit a signal on the PSFCH.

(2) Option 2: If the receiving UE successfully decodes the corresponding transport block, the receiving UE may transmit an HARQ-NACK on the PSFCH. After the receiving UE decodes a related PSCCH targeting the receiving UE, if the receiving UE fails to successfully decode the corresponding transport block, the receiving UE may transmit an HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated, to the base station, by a UE existing within a coverage using a PUCCH. The transmitting UR may also transmit an indication to a service base station of the transmitting UE in the form of a Scheduling Request (SR)/Buffer Status Report (BSR) and not in the form of an HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

According to various embodiments of the present disclosure, based on Tables 5 to 7 below, a UE may perform sidelink communication with another UE through a physical layer structure.

TABLE 5

PSCCH structure
It needs to support the case where frequency resource of a PSCCH is mapped within a sub-channel.
In case of 2 stage SCI, at least the following aspects need to be investigated.
Whether L1 source ID is scrambled with CRC of $2^{nd}$ SCI?

TABLE 5-continued e.g., in case of connectionless groupcast, the false detection probability of $2^{nd}$ SCI's CRC will be increased since RX UE doesn't know L1 source ID of TX UE.
How to transmit $2^{nd}$ SCI?
  e.g., when $2^{nd}$ SCI is piggybacked on PSSCH, its mapping location is implicitly determined depending on PSSCH resource allocation and it is decoded by using PSSCH DM-RS.
Which information can be conveyed via $2^{nd}$ SCI?
  e.g., TX UE's location Referring to Table 5, for example, the UE may perform sidelink communication with another terminal based on the PSCCH structure and/or the DM-RS pattern. For example, it may be necessary to support the case where the frequency resource of the PSCCH is mapped in the subchannel.

TABLE 6

PSFCH structure
  NR PUCCH format 0/2 can be a starting point.
    Symbol repetition number larger than 2 can be considered further if the coverage/performance enhancement is necessary.
    NR PUCCH format 2 would be useful especially when multiple slots (e.g., >1) are associated with a PSFCH resource (i.e., SL HARQ payload size is larger than 2 bits).
  At least for unicast, SL-RSRP measurement can be conveyed via PSSCH.
  Considering additional AGC for PSSCH reception and complexity of power sharing between PSSCH and PSFCH, it is not preferred to support FDM between PSSCH and PSFCH format using last symbol(s) in a slot.

Referring to Table 6, for example, a UE may perform sidelink communication with another UE based on the PSFCH structure.

TABLE 7

Bandwidth part
  UE is not expected to have switching latency between SL BWP and active Uu BWP(s) in the same carrier at a given time.
  UE assumes that SL TX/RX operation is deactivated when it switches to initial Uu BWP of which numerology is different from SL BWP.
    It is not desirable to restrict the same numerology setting between initial Uu BWP and active Uu BWP(s).
Resource pool
  It is supported that the resource pool can consist of non-contiguous PRBs (e.g., for the increment of resource utilization efficiency in the shared licensed carrier).
  In shared licensed carrier, at least UL symbols configured by cell-specific higher layer signaling in NR Uu are used for NR SL.

Referring to Table 7, for example, a UE may perform sidelink communication with another terminal based on a bandwidth part (BWP) and/or a resource pool. For example, the UE may not expect switching latency between the sidelink BWP and the active Uu BWP within the same carrier. According to various embodiments of the present disclosure, based on Tables 8 to 9 below, the UE may perform sidelink communication with another UE through a physical layer procedure.

TABLE 8

PSFCH resource determination
  Implicit mechanism for determining frequency and/or code domain resource of PSFCH is supported by using at least parameters such as "slot" where the-associated PSSCH is transmitted and/or "sub-channel(s)" where the associated PSSCH is mapped on.
SL HARQ feedback mechanism
  To handle the following problematic cases from a single UE perspective, a prioritization rule based on e.g., (associated) service/packet priority, feedback information type/amount can be defined.
    (a) FDMed transmission of multiple PSFCH resources is required at the same time.
    (b) PSFCH transmission and reception are overlapped in the time domain.

TABLE 8-continued

Considering inaccuracy/variation of L1-RSRP measurement, it is not clear whether it can be used alone for determining HARQ feedback transmission in groupcast.
    FFS on whether L1-RSRP can be used as a fallback metric when both TX-RX geographical distance and L1-RSRP are enabled and the position accuracy of UE is not good enough.

Referring to Table 8, for example, a UE may perform sidelink communication with another UE based on PSFCH resource determination and/or a sidelink HARQ feedback mechanism. For example, an implicit mechanism for determining a frequency domain resource and/or a code domain resource of a PSFCH may be supported using parameters such as a slot in which an associated PSSCH is transmitted. For example, an implicit mechanism for determining a frequency domain resource and/or a code domain resource of a PSFCH may be supported using a subchannel to which an associated PSSCH is mapped.

TABLE 9

SL open-loop power control
    For SL-RSRP measurement/reporting for OLPC for PSCCH/PSSCH, down select one of followings:
        Option 1:
            Support Layer-1 SL-RSRP reporting, and Layer-3 filtering is performed by UE transmitting RS for RSRP measurement
        Option 2:
            UE transmitting RS for RSRP measurement indicates relevant information about the transmit power of the RS, and UE receiving RS for RSRP measurement reports Layer-3 filtered RSRP
    When the SL OLPC is configured to use both DL pathloss (between TX UE and gNB) and SL pathloss (between TX UE and RX UE),
        The transmit power is given by the minimum of the OLPC based on DL pathloss and the OLPC based on SL pathloss.
    When the SL OLPC based on DL pathloss (between TX UE and gNB) is enabled, additional mechanism needs to be considered for handling the transmit power difference depending on the position of in-coverage TX UE (e.g., TX resource pool separation based on DL RSRP).

Figure 12:
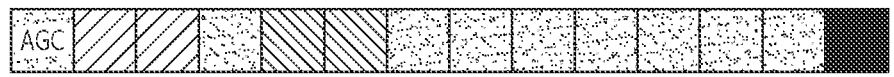
FIG. 12 shows an S-SSB structure according to an embodiment of the present disclosure.
Figure 12:
Figure 12:
Figure 12:
Figure 12:

Referring to Table 9, for example, a UE may perform sidelink communication with another UE based on sidelink open-loop power control. For example, sidelink RSRP measurement/reporting for sidelink open-loop power control for PSCCH/PSSCH may be performed according to various embodiments of the present disclosure. According to various embodiments of the present disclosure, Table 10 below to Table 14, a UE may perform sidelink communication with another UE through synchronization. FIG. 12 shows an S-SSB structure according to an embodiment of the present disclosure.

TABLE 10

Based on several aspects below, the following S-SSB structure can be considered.
    When first OS of S-SSB is used for PSBCH, S-PSS detection performance degradation can be avoided since it can cover both AGC and transient period.
    In terms of S-PSS MCL, using different sequence for each S-PSS is better than that of using same sequence for two S-PSSs (e.g., >2 dB for 15 kHz SCS).
    By placing one PSBCH OS between S-PSS and S-SSS, it is possible to mitigate
        S-PSS/S-SSS detection performance degradation due to a transient period
        S-SSS detection performance degradation due to Doppler shift
            i.e., assuming that the estimated frequency offset value in detecting S-PSS is reused for S-SSS defection Referring to Table 10 and FIG. 12, for example, a UE may perform synchronization for sidelink communication with another UE based on the S-SSB structure.

TABLE 11

To achieve a low correlation with NR Uu PSS, the followings can be considered as an example for S-PSS design.
  $1^{st}$ S-PSS
    Reuse the polynomial/initial value of NR Uu PSS but apply different cyclic shift value (e.g., 21)
      i.e., for a maximum cyclic shift value distance between NR Uu PSS and S-PSS
  $2^{nd}$ S-PSS
    Reuse one of polynomials/initial values of NR Uu SSS (i.e., not used for NR Uu PSS) but apply different cyclic shift value (e.g., 107)
      i.e., for a maximum cyclic shift value distance between $1^{st}$ S-PSS and $2^{nd}$ S-PSS
      i.e., for a low cross correlation between $1^{st}$ S-PSS and $2^{nd}$ S-PSS Referring to Table 11, for example, the UE may perform synchronization for sidelink communication with another UE based on the S-PSS structure for achieving low correlation with the NR Uu PSS.

TABLE 12

The following WA can be confirmed.
  For the case of left column, if further optimization is considered to address a relatively lower priority of gNH/eNB based synch reference, we prefer to reuse Rel-14 LTE V2X rule.

Referring to Table 12, for example, a UE may perform synchronization for sidelink communication with another UE based on a relatively low priority of gNB/eNB-based synchronization. Table 13 below may indicate the priority of GNSS-based synchronization and the priority of gNB/eNB-based synchronization.

TABLE 13

| GNSS based synchronization | gNB/eNB based synchronization |
|---|---|
| P0: GNSS | P0: gNB/eNB |
| P1: GNSS synchronized directly to the UE | P1: gNB/eNB synchronized directly to the UE |
| P2: GNSS synchronized indirectly to the UE | P2: gNB/eNB synchronized indirectly to the UE |
| P3: The remaining UEs have the lowest priority | P3: GNSS |
| | P4: GNSS synchronized directly to the UE |
| | P5: GNSS synchronized indirectly to the UE |
| | P6: The remaining UEs have the lowest priority |

TABLE 14

In case of using a sidelink RS for synchronization purpose, it needs to introduce an indicator which can provide the information at least on whether a UE is directly synchronized to GNSS and its synchronization quality (e.g., RS timing) is good enough for other UEs to take it as a synchronization tracking/reference.

Sidelink operation needs to be supported in asynchronous cell deployment, and the mechanism of Rel. 12/13 D2D (e.g., signaling information of neighboring cell's SLSS resource location) is a starting point Referring to Table 14, for example, when the UE uses a sidelink reference signal for performing synchronization, It may be necessary to introduce an indicator providing information on whether the UE is directly synchronized to the GNSS and/or information on whether the synchronization quality (e.g., RS timing) is sufficient. According to various embodiments of the present disclosure, based on Tables 15 and 16 below, a UE may use a resource allocation mechanism to Sidelink communication with another UE may be performed.

TABLE 15

Mode 1
   For multiple configured grants without having other restrictions on what can be transmitted (e.g., based on destination UE), it can be allowed that different transmissions of a TB takes place across those configured grants.
Mode 2 (1)
   When the resource reservation for feedback-based HARQ retransmission is considered, at least the following aspects need to be investigated.
      How to identify/reuse another UE's unused retransmission resource(s) (especially in case of high congested scenarios)?
         e.g., in case of unicast, when a RX UE transmit ACK to its TX UE, it can reuse the TX UE's remaining retransmission resource(s)
         e.g., by overhearing of feedback information
      How many retransmission resources are needed to be reserved by a single SCI?
         e.g., it has an impact on SCI payload size/decoding performance and collision avoidance efficiency Referring to Table 15, for example, a UE may perform sidelink communication with another UE based on mode 1 and/or mode 2.

TABLE 16

Mode 2 (2)
   In case of standalone PSCCH transmission for resource reservation, at least the following aspects need to be investigated.
      How to handle additional AGC for PSSCH reception and half duplex problem?
         e.g., reducing AGC impact by transmitting dummy data via PSSCH
      How to derive DMRS RSRP measurement used for deciding whether the reserved resource (e.g., for initial transmission) is assumed to be idle?
         e.g., by using DMRS of PSCCH or PSSCH carrying dummy data Referring to Table 16, for example, a UE may perform sidelink communication with another UE based on mode 2.

TABLE 17

Considering the following aspects, we still prefer to support only SL mode 3-like RRC-configured SPS scheduling with RRC-based activation/release.
   In case of LTE Uu controlling NR SL, it was agreed that LTE Uu schedules NR SL mode 1 only based on "Type 1 configured grant".
      i.e., it means that RRC signaling based operation is sufficient even for advanced use cases of NR SL which have tighter requirements when compared to basic safety use case of LTE SL.
   Considering that UE reports "RRC layer" assistance information about LTE SL via NR Uu interface to gNB, it is not clear what benefit can be achieved by SL mode 3-like RRC-configured SPS scheduling with DCI-based activation/release.
      i.e., in other words, the update time scale of LTE SL traffic information at gNB side is limited with a time granularity of RRC signaling update.
   It is not reasonable to include "only activation/release information" in DCI since there is no benefit if other information (e.g., time/frequency resource location/size) is updated via RRC signaling.

Referring to Table 17, for example, sidelink mode 3 such as RRC-configured SPS scheduling for RRC-based activation/release may be supported.

TABLE 18

To handle TX/RX overlap in short term TDM solutions,
  If packet priorities of both sidelink transmission and reception are known to both RATs
  (prior to time of transmission subject to processing time restriction), then the transmission
  or reception of packet with a higher relative priority is performed.
    i.e., in case when the priorities of sidelink transmission and reception are the same,
    then it is up to UE implementation as to which transmission or reception is chosen.
  If packet priorities of sidelink transmission and reception are not known to both RATs
  (prior to time of transmission subject to processing time restriction), then it is up to UE
  implementation to manage TX/RX overlaps.

Referring to Table 18, for example, the overlap of transmission and reception may be processed in a short term TDM solution.

Meanwhile, in various embodiments of the present disclosure, for example, a transmitting UE (TX UE) may be a UE transmitting data to a (target) receiving UE (RX UE). For example, a TX UE may be a UE performing PSCCH and/or PSSCH transmission. And/or, for example, a TX UE may be a UE that transmits an SL CSI-RS and/or SL CSI report request indicator to a (target) RX UE. And/or, for example, a TX UE may be a UE that transmits a reference signal (e.g., DM-RS, CSI-RS) on a channel and/or the (control) channel (e.g., PSCCH, PSSCH) to be used for the SL RLM and/or SL RLF operation of a (target) RX UE.

Meanwhile, in various embodiments of the present disclosure, for example, a receiving UE (RX UE) may be a UE transmitting SL HARQ feedback to a transmitting UE (TX UE) according to whether decoding of data received from the TX UE succeeds and/or whether the detection/decoding success of a PSCCH (related to a PSSCH scheduling) transmitted by the TX UE. And/or, for example, a RX UE may be a UE that performs SL CSI transmission to a TX UE based on the SL CSI-RS and/or the SL CSI report request indicator received from the TX UE. And/or, for example, a RX UE is a UE that transmits to a TX UE a SL (L1) RSRP measurement value measured based on a (pre-defined) reference signal and/or the SL (L1) RSRP report request indicator received from the TX UE. And/or, for example, a RX UE may be a UE that transmits its own data to a TX UE. And/or, for example, a RX UE may be a UE that performs SL RLM and/or SL RLF operations based on a reference signal on a (control) channel and/or a (pre-configured) (control) channel received from a TX UE.

Meanwhile, in various embodiments of the present disclosure, for example, when the RX UE transmits SL HARQ feedback information for the PSSCH and/or PSCCH received from the TX UE, the following scheme or some of the following schemes may be considered. Herein, for example, the following scheme or some of the following schemes may be limitedly applied only when the RX UE successfully decodes/detects the PSCCH scheduling the PSSCH.

(1) Groupcast HARQ feedback option 1: NACK information may be transmitted to the TX UE only when the RX UE fails to decode/receive the PSSCH received from the TX UE.

(2) Groupcast HARQ feedback option 2: When the RX UE succeeds in decoding/receiving the PSSCH received from the TX UE, ACK information may be transmitted to the TX UE, and when PSSCH decoding/reception fails, NACK information may be transmitted to the TX UE.

Meanwhile, in various embodiments of the present disclosure, for example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on a PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information, information on the number of antenna ports Meanwhile, in various embodiments of the present disclosure, for example, since the TX UE may transmit the SCI, the first SCI and/or the second SCI to the RX UE through the PSCCH, the PSCCH may be replaced/substituted with at least one of SCI, first SCI, and/or second SCI. And/or, for example, the SCI may be replaced/replaced by the PSCCH, the first SCI and/or the second SCI. And/or, for example, since the TX UE may transmit the second SCI to the RX UE through the PSSCH, the PSSCH may be replaced/substituted with the second SCI.

Meanwhile, in various embodiments of the present disclosure, for example, when SCI configuration fields are divided into two groups in consideration of the (relatively) high SCI payload size, the first SCI including the first SCI configuration field group may be referred to as 1st SCI, and the second SCI including the second SCI configuration field group may be referred to as 2nd SCI. In addition, for example, the 1st SCI may be transmitted to the receiving UE through the PSCCH. In addition, for example, the 2nd SCI may be transmitted to the receiving UE through (independent) PSCCH, or may be piggybacked with data through PSSCH and transmitted.

Meanwhile, in various embodiments of the present disclosure, "configuration" or "define" may mean (resource pool specific) (pre-) configuration from a base station or network (via pre-defined signaling (e.g., SIB, MAC, RRC, etc.)).

Meanwhile, in this specification, for example, since RLF may be determined based on an OUT-OF-SYNCH (OOS) indicator or an IN-SYNCH (IS) indicator, RLF may be replaced/replaced by an OUT-OF-SYNCH (OOS) or an IN-SYNCH (IS).

Meanwhile, in various embodiments of the present disclosure, a resource block (RB) may be replaced/substituted with a sub-carrier. In addition, for example, in the present disclosure, a packet or traffic may be substituted/replaced with a transport block (TB) or MAC PDU according to a transmitted layer.

Meanwhile, in various embodiments of the present disclosure, for example, a CBG may be replaced/substituted with a TB.

Meanwhile, in various embodiments of the present disclosure, for example, a source ID may be replaced/substituted with a destination ID.

Meanwhile, in various embodiments of the present disclosure, for example, a L1 ID may be replaced/substituted by a L2 ID. For example, a L1 ID may be a L1 source ID or a L1 destination ID. For example, a L2 ID may be a L2 source ID or a L2 destination ID.

Meanwhile, in various embodiments of the present disclosure, a channel may be replaced/substituted with a signal. For example, transmission/reception of a channel may include transmission/reception of a signal. For example, transmission/reception of a signal may include transmission/reception of a channel.

Meanwhile, in various embodiments of the present disclosure, for example, a cast type may be interchanged/substituted with a unicast, a groupcast, and/or a broadcast. For example, a cast type may be interchanged/substituted with at least one of unicast, groupcast, and/or broadcast. For example, the cast or cast type may include unicast, groupcast and/or broadcast.

Meanwhile, in various embodiments of the present disclosure, for example, resources may be interchanged/replaced with slots or symbols.

Meanwhile, in various embodiments of the present disclosure, for convenience of explanation, for example, a (physical) channel used when the RX UE transmits at least one of the following information to the TX UE may be referred to as a PSFCH.

SL HARQ feedback, SL CSI, SL (L1) RSRP

Meanwhile, in various embodiments of the present disclosure, the sidelink information may include at least one of a sidelink message, a sidelink packet, a sidelink service, sidelink data, sidelink control information, and/or a sidelink transport block (TB). For example, the sidelink information may be transmitted through a PSSCH and/or a PSCCH.

Meanwhile, in various embodiments of the present disclosure, when one PSFCH slot in the resource pool is linked with a plurality of PSSCH/PSSCH transmission slots and/or one PSFCH slot in the resource pool is received by FDM a plurality of PSSCH/PSCCH from different UEs through a plurality of sessions (e.g., unicast, groupcast), from a specific UE point of view, there may be a problem in that a plurality of PSFCH transmissions or PSFCH receptions on which FDM is performed must be performed simultaneously. For example, when one PSFCH slot is related with slots related to a plurality of PSSCH transmissions and/or slots related to a plurality of PSCCH transmissions, there may be a problem that the UE has to perform transmission/reception of a plurality of PSFCHs at the same time point. And/or, when the UE receives a plurality of PSSCHs/PSCCHs on which FDM is performed through a plurality of sessions (e.g., unicast, groupcast), there may be a problem that the UE has to perform transmission/reception of a plurality of PSFCHs at the same time point. A method of efficiently handling PSFCH transmission/reception is proposed through various embodiments of the present disclosure in the above-described circumstances.

According to an embodiment of the present disclosure, the UE may omit PSFCH transmission/reception having a relatively low priority based on a rule related to a priority to be described later. For example, the UE may randomly select PSFCH transmission/reception among PSFCH transmission/reception having the same priority. Alternatively, for example, PSFCH transmission/reception having the same priority may be processed by the UE implementation.

For example, the PSFCH including ACK information or NACK information may be configured to have a relatively high priority. For example, the UE may transmit/receive a PSFCH including ACK information or NACK information with priority.

And/or, for example, the priority of the PSFCH may be configured to be the same as the priority related to the service/packet related with PSFCH. For example, the UE may determine the priority of the PSFCH to be the same as the priority related to the service/packet related with the PSFCH and/or the PSSCH/PSCCH related with the PSFCH.

And/or, for example, the priority of the PSFCH including a relatively large amount of HARQ feedback information may be configured to have a relatively high priority. For example, the UE may determine the priority of the PSFCH including a relatively large amount of HARQ feedback information to be high. For example, the UE may determine the priority of the PSFCH to be higher as the amount of HARQ feedback information included in the PSFCH increases.

And/or, for example, PSFCH transmission may be configured to have a relatively higher priority than PSFCH reception. For example, PSFCH reception may be configured to have a relatively higher priority than PSFCH transmission. For example, the UE may perform PSFCH transmission preferentially over PSFCH reception. For example, the UE may perform PSFCH reception preferentially over PSFCH transmission.

And/or, for example, PSFCH transmission including NACK information or ACK information may be configured to have a relatively higher priority than PSFCH reception. For example, the UE may perform PSFCH transmission including NACK information or ACK information preferentially over PSFCH reception.

And/or, for example, PSFCH transmission or PSFCH reception related to a UE having a relatively high RSRP measurement value (e.g., L1 RSRP measurement value) may be configured to have a relatively high priority. For example, PSFCH transmission or PSFCH reception related to a UE having a relatively low RSRP measurement value (e.g., L1 RSRP measurement value) may be configured to have a relatively high priority. Alternatively, for example, PSFCH transmission or PSFCH reception related to a UE having a high channel quality state may be configured to have a relatively high priority. For example, PSFCH transmission or PSFCH reception related to a UE having a low channel quality state may be configured to have a relatively high priority. For example, the UE may preferentially perform PSFCH transmission or PSFCH reception related to the UE having a high RSRP measurement value (e.g., L1 RSRP measurement value). For example, the UE may preferentially perform PSFCH transmission or PSFCH reception related to the UE having a low RSRP measurement value (e.g., L1 RSRP measurement value). For example, the UE may preferentially perform PSFCH transmission or PSFCH reception related to the UE having a high channel quality state. For example, the UE may preferentially perform PSFCH transmission or PSFCH reception related to the UE having a low channel quality state.

And/or, for example, PSFCH transmission or PSFCH reception related to a UE having a relatively high number of retransmissions may be configured to have a relatively high priority. For example, the PSFCH transmission or PSFCH reception related to a UE having a higher number of retransmissions than a pre-configured threshold may be configured to have a relatively high priority. For example, PSFCH transmission or PSFCH reception related to a UE having a relatively low number of retransmissions may be configured to have a relatively high priority. For example, the PSFCH transmission or PSFCH reception related to a UE having a lower number of retransmissions than a pre-configured threshold may be configured to have a relatively high priority. For example, the UE may preferentially perform PSFCH transmission or PSFCH reception related to a UE having a high number of retransmissions. For example, the UE may preferentially perform PSFCH transmission or PSFCH reception related to a UE having a higher number of retransmissions than a pre-configured threshold value. For example, the UE may preferentially perform PSFCH transmission or PSFCH reception related to a UE having a low number of retransmissions. For example, the UE may preferentially perform PSFCH transmission or PSFCH reception related to a UE having a lower number of retransmissions than a pre-configured threshold value And/or, for example, a PSFCH related to a pre-configured cast type (e.g., unicast or groupcast) may be configured to have a relatively high priority. For example, the UE may preferentially perform PSFCH transmission or PSFCH reception related to a pre-configured cast type (e.g., unicast or groupcast).

And/or, for example, a PSFCH based on NACK only feedback (i.e., groupcast HARQ feedback option 1) may be configured to have a relatively higher priority than a PSFCH based on ACK/NACK feedback (i.e., groupcast HARQ feedback option 2). For example, a PSFCH based on NACK only feedback (i.e., groupcast HARQ feedback option 1) may be configured to have a relatively lower priority than a PSFCH based on ACK/NACK feedback (i.e., groupcast HARQ feedback option 2). For example, the UE may preferentially perform PSFCH transmission or PSFCH reception based on groupcast HARQ feedback option 1 over PSFCH transmission or PSFCH reception based on groupcast HARQ feedback option 2. For example, the UE may preferentially perform PSFCH transmission or PSFCH reception based on groupcast HARQ feedback option 2 over PSFCH transmission or PSFCH reception based on groupcast HARQ feedback option 1.

Figure 13:
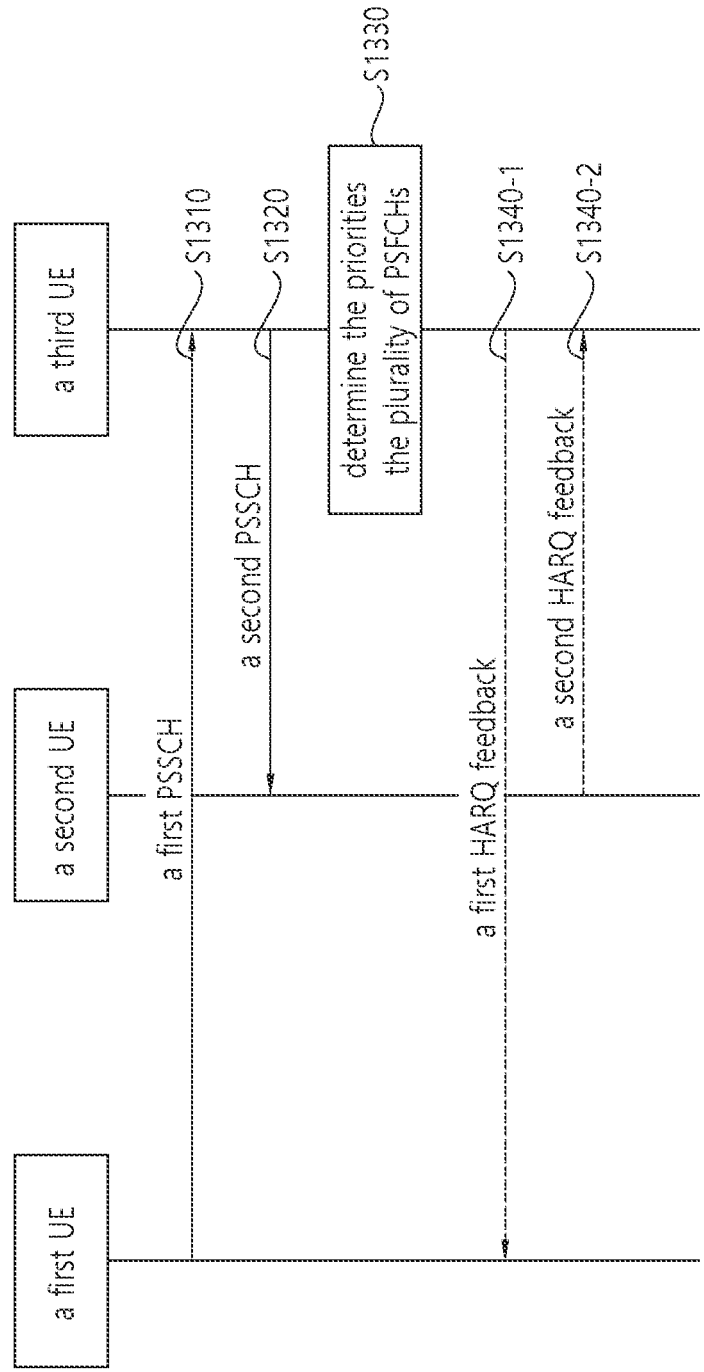
FIG. 13 shows a procedure in which a UE performs PSFCH transmission or PSFCH reception based on a priority of the PSFCH, in accordance with an embodiment of the present disclosure.

FIG. 13 shows a procedure in which a UE performs PSFCH transmission or PSFCH reception based on a priority of the PSFCH, in accordance with an embodiment of the present disclosure. The embodiment of FIG. 13 may be combined with various embodiments of the present disclosure.

Referring to FIG. 13, in step S1310, a third UE may perform a first PSSCH reception from a first UE. For example, the third UE may receive sidelink information from the first UE through the first PSSCH. In step S1320, the third UE may perform a second PSSCH transmission to the second UE. For example, the third UE may transmit sidelink information to the second UE through the second PSSCH. For example, the third UE may perform reception of a plurality of first PSSCHs on which FDM is performed or transmission of a plurality of second PSSCHs on which FDM is performed.

In step S1330, the third UE may determine priorities for a plurality of PSFCHs. For example, the plurality of PSFCHs may include a PSFCH related with a first PSSCH and a PSFCH related with a second PSSCH. For example, the plurality of PSFCHs may include a PSFCH related with a plurality of FDMed first PSSCHs and a PSFCH related with a plurality of FDMed second PSSCHs. Herein, for example, the 'FDMed' may mean 'FDM was performed'.

For example, the third UE may determine the priority of each of the plurality of PSFCHs differently based on ACK (acknowledgement) information or NACK (negative-acknowledgement) information included in the PSFCH. For example, the third UE may determine the priority of the PSFCH including the ACK information to be higher than the priority of the PSFCH including the NACK information. For example, the third UE may determine the priority of the PSFCH including the NACK information to be higher than the priority of the PSFCH including the ACK information.

For example, the third UE may determine the priority of each of the plurality of PSFCHs to be the same as the priority of the PSSCH/PSCCH related with each of the plurality of PSFCHs. For example, the third UE may determine the priority of the plurality of PSFCHs to be the same as the priority of the service/packet related with each of the plurality of PSFCHs.

For example, the third UE may determine the priority for each of the plurality of PSFCHs differently based on the amount of HARQ feedback included in the PSFCH. For example, the third UE may determine the priority of the PSFCH having a large amount of HARQ feedback to be higher than the priority of the PSFCH having a small amount of HARQ feedback.

For example, the third UE may determine the priority for each of the plurality of PSFCHs differently according to PSFCH transmission or PSFCH reception. For example, the third UE may determine a priority of a PSFCH on which sidelink transmission is to be performed to be higher than a priority of a PSFCH on which sidelink reception is to be performed. For example, the third UE may determine the priority of the PSFCH related with the first PSSCH to be higher than the priority of the PSFCH related with the second PSSCH. For example, the third UE may determine a priority of a PSFCH on which sidelink reception is to be performed to be higher than a priority of a PSFCH on which sidelink transmission is to be performed.

For example, the third UE may determine a priority of a PSFCH on which NACK information or ACK information is transmitted to be higher than a priority of a PSFCH on which sidelink information is received. For example, the third UE may determine a priority of a PSFCH through which NACK information will be transmitted corresponding to the first PSSCH is higher than a priority of a PSFCH through which sidelink information will be received corresponding to the second PSSCH. For example, the third UE may determine a priority of a PSFCH on which ACK information will be transmitted corresponding to the first PSSCH is higher than a priority of a PSFCH on which sidelink information will be received in correspondence with the second PSSCH.

For example, the third UE may differently determine the priority of each of the plurality of PSFCHs based on a reference signal received power (RSRP) value measured by the third UE. For example, the RSRP value may be measured based on a reference signal (RS) on the PSSCH related with each of the plurality of PSFCHs. For example, based on the RSRP value measured based on the RS on the first PSSCH and the RSRP value measured through sidelink communication with the second UE, the third UE may determine the priority of the PSFCH related with the first PSSCH and the PSFCH related with the second PSSCH. For example, if the RSRP value measured based on the RS on the first PSSCH is higher than the RSRP measurement value related with the second UE, the third UE may determine the priority of the PSFCH related with the first PSSCH to be higher than the priority of the PSFCH related with the second PSSCH.

For example, the third UE may determine the priority of each of the plurality of PSFCHs differently based on the number of retransmissions of the PSSCH related to the PSFCH. For example, when the number of retransmissions related with the first PSSCH is greater than the number of retransmissions related with the second PSSCH, the third UE may determine the priority of the PSFCH related with the first PSSCH to be higher than the priority of the PSFCH related with the second PSSCH. For example, when the number of retransmissions related with the first PSSCH is less than the number of retransmissions related with the second PSSCH, the third UE may determine the priority of the PSFCH related with the first PSSCH to be higher than the priority of the PSFCH related with the second PSSCH.

For example, the third UE may determine the priority of each of the plurality of PSFCHs differently based on the cast type of the PSSCH related to the PSFCH. For example, when the first PSSCH is transmitted based on the unicast and the second PSSCH is received based on the groupcast, the third UE may determine the priority of the PSFCH related with the first PSSCH to be higher than the priority of the PSFCH related with the second PSSCH. For example, when the first PSSCH is transmitted based on the groupcast and the second PSSCH is received based on the unicast, the third UE may determine the priority of the PSFCH related with the first PSSCH to be higher than the priority of the PSFCH related with the second PSSCH.

For example, the third UE may determine the priority for each of the plurality of PSFCHs differently based on the HARQ feedback option related to the PSFCH. For example, when the first PSSCH is transmitted based on the groupcast HARQ feedback option 1 and the second PSSCH is received based on the groupcast HARQ feedback option 2, the third UE may determine the priority of the PSFCH related with the first PSSCH to be higher than the priority of the PSFCH related with the second PSSCH. For example, when the first PSSCH is transmitted based on the groupcast HARQ feedback option 2 and the second PSSCH is received based on the groupcast HARQ feedback option 1, the third UE may determine the priority of the PSFCH related with the first PSSCH to be higher than the priority of the PSFCH related with the second PSSCH.

In step S1340-1, the third UE may transmit a first HARQ feedback to the first UE based on the priority of the PSFCH. For example, when the third UE determines the priority of the PSFCH related with the first PSSCH to be higher than the priority of the PSFCH related with the second PSSCH, the third UE may transmit the first HARQ feedback to the first UE. That is, for example, the third UE may omit receiving the second HARQ feedback from the second UE.

In step S1340-2, the third UE may receive the second HARQ feedback from the second UE based on the priority of the PSFCH. For example, when the third UE determines the priority of the PSFCH related with the second PSSCH to be higher than the priority of the PSFCH related with the first PSSCH, the third UE may receive the second HARQ feedback from the second UE. That is, for example, the third UE may omit transmitting the first HARQ feedback to the first UE.

Figure 14:
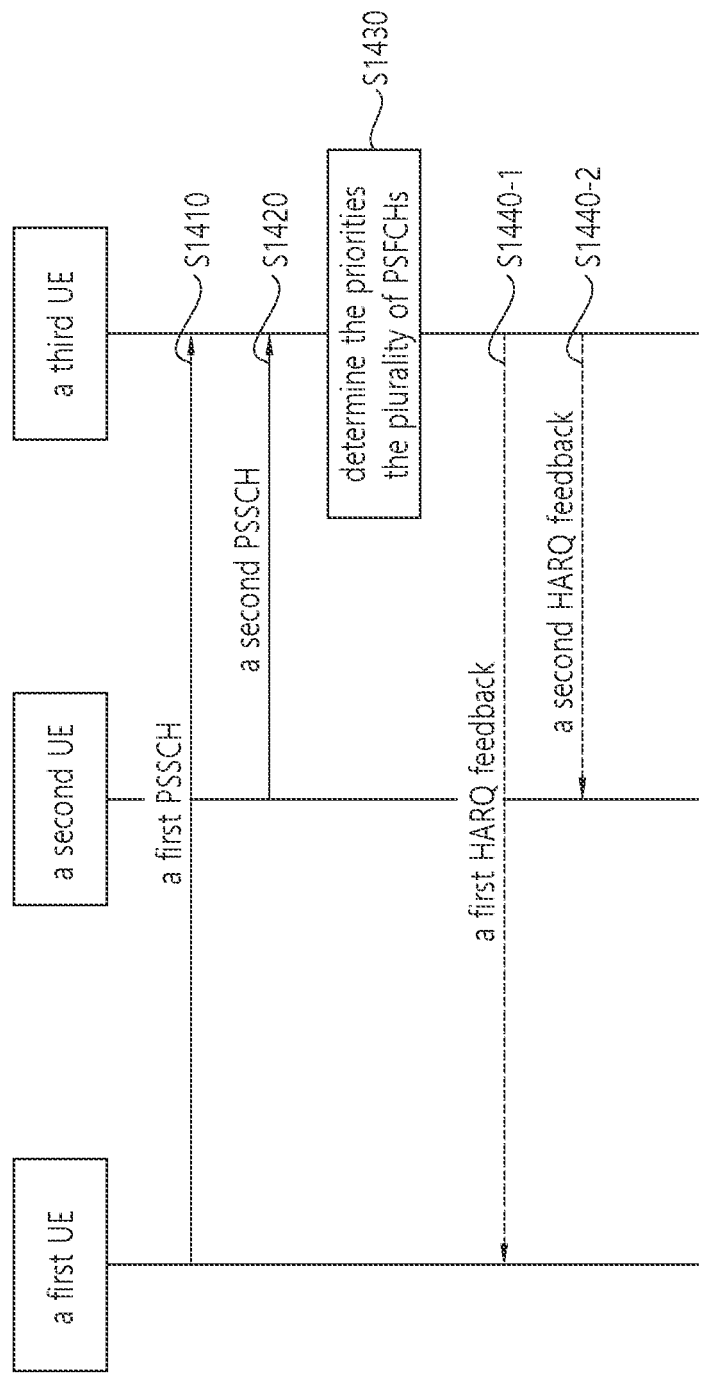
FIG. 14 shows a procedure in which a UE performs PSFCH transmission based on a priority of the PSFCH, in accordance with an embodiment of the present disclosure.

FIG. 14 shows a procedure in which a UE performs PSFCH transmission based on a priority of the PSFCH, in accordance with an embodiment of the present disclosure. The embodiment of FIG. 14 may be combined with various embodiments of the present disclosure.

Referring to FIG. 14, in step S1410, a third UE may perform a first PSSCH reception from a first UE. For example, the third UE may receive sidelink information from the first UE through the first PSSCH. In step S1420, the third UE may perform a second PSSCH reception from the second UE. For example, the third UE may receive sidelink information from the second UE through the second PSSCH. For example, the third UE may perform reception of a plurality of first PSSCHs on which FDM is performed and reception of a plurality of second PSSCHs on which FDM is performed.

In step S1430, the third UE may determine priorities for a plurality of PSFCHs. For example, the plurality of PSFCHs may include a PSFCH related with the first PSSCH and a PSFCH related with the second PSSCH. For example, the plurality of PSFCHs may include a PSFCH related with a plurality of FDMed first PSSCHs and a PSFCH related with a plurality of FDMed second PSSCHs. Herein, for example, the 'FDMed' may mean 'FDM was performed'.

For example, the third UE may determine the priority of each of the plurality of PSFCHs differently based on ACK (acknowledgement) information or NACK (negative-acknowledgement) information included in the PSFCH. For example, the third UE may determine the priority of the PSFCH including the ACK information to be higher than the priority of the PSFCH including the NACK information. For example, the third UE may determine the priority of the PSFCH including the NACK information to be higher than the priority of the PSFCH including the ACK information.

For example, the third UE may determine the priority of each of the plurality of PSFCHs to be the same as the priority of the PSSCH/PSCCH related with each of the plurality of PSFCHs. For example, the third UE may determine the priority of the PSFCH related with the first PSSCH to be the same as the priority related with the first PSSCH. For example, the third UE may determine the priority of the PSFCH related with the second PSSCH to be the same as the priority related with the second PSSCH. For example, the third UE may determine the priority of the plurality of PSFCHs to be the same as the priority of the service/packet related with each of the plurality of PSFCHs.

For example, the third UE may determine the priority for each of the plurality of PSFCHs differently based on the amount of HARQ feedback included in the PSFCH. For example, the third UE may determine the priority of the PSFCH having a large amount of HARQ feedback to be higher than the priority of the PSFCH having a small amount of HARQ feedback.

For example, the third UE may differently determine the priority of each of the plurality of PSFCHs based on a reference signal received power (RSRP) value measured by the third UE. For example, the RSRP value may be measured based on a reference signal (RS) on the PSSCH related with each of the plurality of PSFCHs. For example, based on the RSRP value measured based on the RS on the first PSSCH and the RSRP value measured through sidelink communication with the second UE, the third UE may determine the priority of the PSFCH related with the first PSSCH and the PSFCH related with the second PSSCH. For example, if the RSRP value measured based on the RS on the first PSSCH is higher than the RSRP measurement value related with the second UE, the third UE may determine the priority of the PSFCH related with the first PSSCH to be higher than the priority of the PSFCH related with the second PSSCH.

For example, the third UE may determine the priority of each of the plurality of PSFCHs differently based on the number of retransmissions of the PSSCH related to the PSFCH. For example, when the number of retransmissions related with the first PSSCH is greater than the number of retransmissions related with the second PSSCH, the third UE may determine the priority of the PSFCH related with the first PSSCH to be higher than the priority of the PSFCH related with the second PSSCH. For example, when the number of retransmissions related with the first PSSCH is less than the number of retransmissions related with the second PSSCH, the third UE may determine the priority of the PSFCH related with the first PSSCH to be higher than the priority of the PSFCH related with the second PSSCH.

For example, the third UE may determine the priority of each of the plurality of PSFCHs differently based on the cast type of the PSSCH related to the PSFCH. For example, when the first PSSCH is transmitted based on the unicast and the second PSSCH is received based on the groupcast, the third UE may determine the priority of the PSFCH related with the first PSSCH to be higher than the priority of the PSFCH related with the second PSSCH. For example, when the first PSSCH is transmitted based on the groupcast and the second PSSCH is received based on the unicast, the third UE may determine the priority of the PSFCH related with the first PSSCH to be higher than the priority of the PSFCH related with the second PSSCH.

For example, the third UE may determine the priority for each of the plurality of PSFCHs differently based on the HARQ feedback option related to the PSFCH. For example, when the first PSSCH is transmitted based on the groupcast HARQ feedback option 1 and the second PSSCH is received based on the groupcast HARQ feedback option 2, the third UE may determine the priority of the PSFCH related with the first PSSCH to be higher than the priority of the PSFCH related with the second PSSCH. For example, when the first PSSCH is transmitted based on the groupcast HARQ feedback option 2 and the second PSSCH is received based on the groupcast HARQ feedback option 1, the third UE may determine the priority of the PSFCH related with the first PSSCH to be higher than the priority of the PSFCH related with the second PSSCH.

In step S1440-1, the third UE may transmit a first HARQ feedback to the first UE based on the priority of the PSFCH. For example, when the third UE determines the priority of the PSFCH related with the first PSSCH to be higher than the priority of the PSFCH related with the second PSSCH, the third UE may transmit the first HARQ feedback to the first UE. That is, for example, the third UE may omit transmitting a second HARQ feedback to the second UE.

In step S1440-2, the third UE may transmit a second HARQ feedback to the second UE based on the priority of the PSFCH. For example, when the third UE determines the priority of the PSFCH related with the second PSSCH to be higher than the priority of the PSFCH related with the first PSSCH, the third UE may transmit the second HARQ feedback to the second UE. That is, for example, the third UE may omit transmitting the first HARQ feedback to the first UE.

According to an embodiment of the present disclosure, when the UE performs a plurality of PSFCH transmissions (hereinafter, the number of PSFCHs to be transmitted by the UE is referred to as ACT_NUM), if ACT_NUM is greater than the maximum number of PSFCH transmissions that can be transmitted (hereinafter, NOM_NUM), the UE may perform PSFCH transmission based on the following rules. For example, the maximum number of PSFCH transmissions that can be transmitted may be the number of HARQ feedbacks that the UE can transmit at the same time. For example, the maximum number of PSFCH transmissions that can be transmitted may be a pre-configured maximum number of PSFCH transmissions. Here, for example, ACT_NUM may be the number after the dropping rule for PSFCH transmission based on a predefined priority is applied. For example, ACT_NUM may be the number before a dropping rule for PSFCH transmission based on a predefined priority is applied. For example, ACT_NUM may be the number after the dropping rule for PSFCH transmission based on a predefined priority related to the PSSCH related with the PSFCH is applied. For example, ACT_NUM may be the number before a dropping rule for PSFCH transmission based on a predefined priority related to the PSSCH related with the PSFCH is applied. For example, ACT_NUM may be the number after dropping a specific number of PSFCH transmissions based on the priority of the PSFCH. For example, ACT_NUM may be the number before dropping a specific number of PSFCH transmissions based on the priority of the PSFCH.

According to an embodiment of the present disclosure, PSFCH transmission of NOM_NUM may be performed regardless of whether the power is limited case (power-limited case), the remaining PSFCH transmission (e.g., ACT_NUM–NOM_NUM) may be omitted. For example, a case in which power is limited may be a case in which the sum of transmit power required for PSFCH transmission of NOM_NUM is greater than the maximum transmit power value of the UE. For example, the UE may perform PSFCH transmission of NOM_NUM irrespective of whether or not the power is limited. For example, the UE may not perform PSFCH transmission as many as the number excluding NOM_NUM from ACT_NUM.

According to an embodiment of the present disclosure, if the PSFCH transmission of NOM_NUM corresponds to a power-limited case, until the UE is out of the power-limited case, the PSFCH transmission having a relatively low priority among NOM_NUMs may be omitted. For example, the meaning until the UE is out of the power-limited case may mean that the PSFCH transmission is omitted until the power is sufficient. For example, if the PSFCH transmission of NOM_NUM corresponds to a power-limited case, until the UE is out of the power-limited case, the UE may not perform PSFCH transmission of a relatively low priority among NOM NUMB. That is, for example, when the sum of transmission power required for PSFCH transmission of NOM_NUM is greater than the maximum transmission power value of the UE, in order for the UE to make the sum of transmission power required for PSFCH transmission of NOM_NUM be less than or equal to the maximum transmission power value of the UE, the PSFCH transmission having a lower priority than the pre-configured priority may be omitted.

According to an embodiment of the present disclosure, when the UE performs PSFCH transmission according to the above-mentioned rule and one PSFCH transmission remains, if the UE does not escape the power-limited case, the UE may perform the one PSFCH transmission using the remaining available transmission power. For example, in order to make the sum of transmission power required for PSFCH transmission of NOM_NUM less than the maximum transmission power value of the UE, after the UE may omit the PSFCH transmission having a lower priority than a pre-configured priority, one PSFCH transmission may remain. In this case, for example, despite not escaping from power-limited case, the UE may perform the one PSFCH transmission using the remaining available transmission power.

Figure 15:
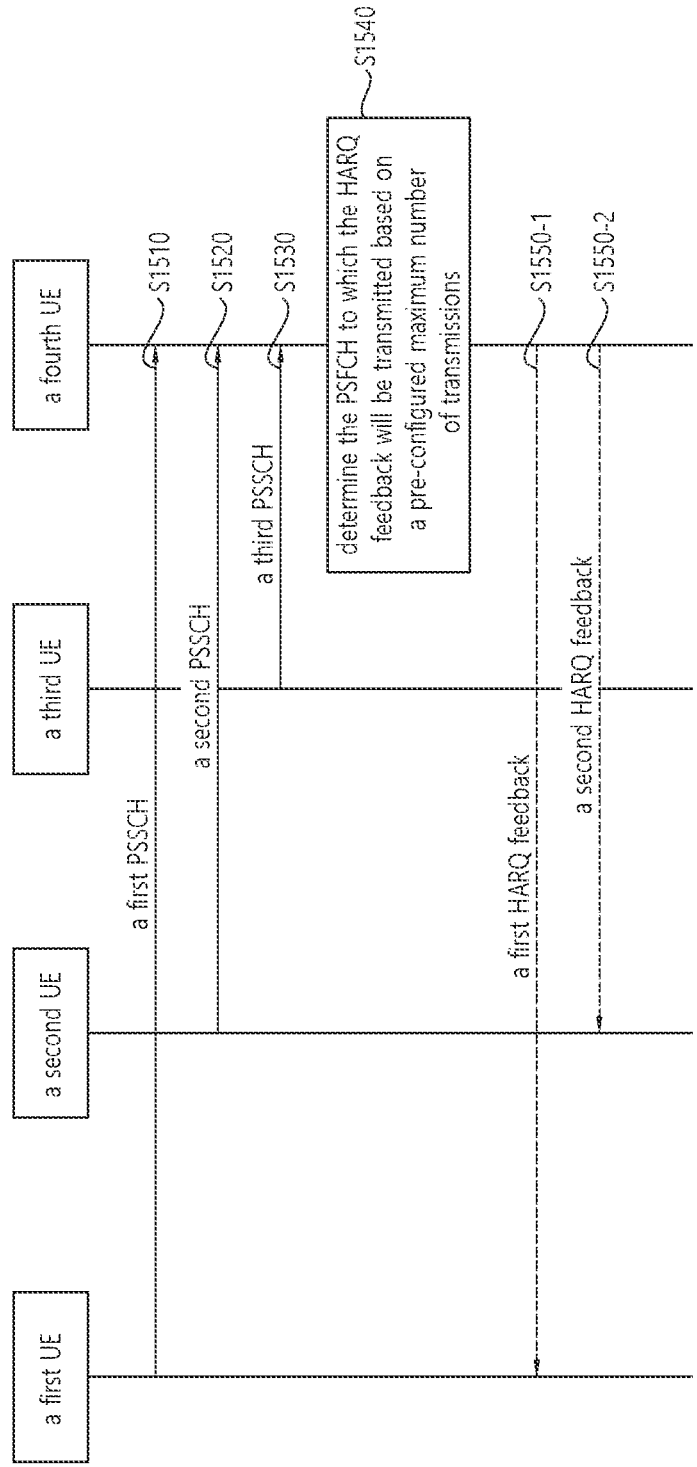
FIG. 15 shows a procedure for a UE to transmit a plurality of PSFCHs based on the maximum number of transmittable PSFCH transmissions, in accordance with an embodiment of the present disclosure.

FIG. 15 shows a procedure for a UE to transmit a plurality of PSFCHs based on the maximum number of transmittable PSFCH transmissions, in accordance with an embodiment of the present disclosure. The embodiment of FIG. 15 may be combined with various embodiments of the present disclosure.

Referring to FIG. 15, in step S1510, a fourth UE may perform a first PSSCH reception from a first UE. For example, the fourth UE may receive sidelink information from the first UE through the first PSSCH. In step S1520, the fourth UE may perform the second PSSCH reception from the second UE. For example, the fourth UE may receive sidelink information from the second UE through the second PSSCH. In step S1530, the fourth UE may perform the third PSSCH reception from the third UE. For example, the fourth UE may receive sidelink information from the third UE through the first PSSCH.

In step S1540, the fourth UE may determine the PSFCH to which the HARQ feedback will be transmitted based on a pre-configured maximum number of transmissions. For example, the pre-configured maximum number of transmissions may be the number that the fourth UE can transmit the maximum HARQ feedback at the same time. For example, the pre-configured maximum number of transmissions may include the pre-configured maximum number of PSFCH transmissions that can be transmitted. For example, when the fourth UE performs three PSFCH transmissions, it may be assumed that the pre-configured maximum number of transmissions is two. In this case, for example, the three PSFCH transmissions may be the number after dropping a specific number of PSFCH transmissions based on the priority of the PSFCH. Alternatively, for example, the three PSFCH transmissions may be the number before dropping a specific number of PSFCH transmissions based on the priority of the PSFCH. For example, the fourth UE may drop a specific number of PSFCF transmissions based on ACK information or NACK information included in the PSFCH. For example, the fourth UE may drop a specific number of PSFCF transmissions based on the priority of the PSSCH/PSCCH related with the PSFCH. For example, the fourth UE may drop a specific number of PSFCF transmissions based on the amount of HARQ feedback included in the PSFCH. For example, the fourth UE may drop a specific number of PSFCF transmissions based on the RSRP value measured by the fourth UE. For example, the fourth UE may drop a specific number of PSFCH transmissions based on the number of retransmissions of the PSSCH related to the PSFCH. For example, the fourth UE may drop a specific number of PSFCF transmissions based on the cast type of the PSSCH related to the PSFCH. For example, the fourth UE may drop a specific number of PSFCH transmissions based on the HARQ feedback option related to the PSFCH.

For example, the fourth UE may perform PSFCH transmission regardless of a power-limited case (a case in which the sum of transmission power required to perform PSFCH transmission as much as the pre-configured maximum number of transmissions is greater than the maximum transmission power value of the fourth UE), and may not perform the remaining PSFCH transmission. That is, for example, the fourth UE may perform two PSFCH transmissions (i.e., the pre-configured maximum number of transmissions) in three PSFCH transmissions and may not perform the remaining one PSFCH transmission.

For example, when the sum of transmission power required to perform PSFCH transmission by the pre-configured maximum number of transmissions is greater than the maximum transmission power value of the fourth UE, transmission power of the fourth UE may be limited. In this case, for example, the fourth UE may omit transmission of one PSFCH. Herein, for example, the one PSFCH transmission may be obtained by subtracting the pre-configured maximum number of transmissions (e.g., 2) from the number (e.g., 3) of PSFCH transmissions to be performed by the fourth UE. For example, the fourth UE may omit transmission related to the lowest priority PSFCH among the three PSFCH transmissions. For example, until the sum of the transmission power required to perform PSFCH transmission by the pre-configured maximum number of transmissions is less than or equal to the maximum transmission power value of the fourth UE, the fourth UE may omit transmission of the PSFCH having a low priority.

For example, in order to make the sum of transmission power required to perform PSFCH transmission by the pre-configured maximum number of transmissions less than or equal to the maximum transmission power value of the fourth UE, the fourth UE may omit transmission of a specific number of PSFCHs, and one PSFCH transmission may remain. If power is still limited despite omitting transmission of a specific number of PSFCHs, the fourth UE may perform one PSFCH transmission using the remaining available transmission power.

In step S1550-1, the fourth UE may transmit the first HARQ feedback to the first UE based on the priority of the PSFCH. In step S1550-2, the fourth UE may transmit the second HARQ feedback to the second UE based on the priority of the PSFCH. For example, when the fourth UE determines the priority of the PSFCH related with the first PSSCH to be higher than the priority of the PSFCH related with the second PSSCH and the priority of the PSFCH related with the third PSSCH, the fourth UE may transmit the first HARQ feedback to the first UE first. For example, when the fourth UE determines the priority of the PSFCH related with the second PSSCH is lower than the priority of the PSFCH related with the first PSSCH and higher than the priority of the PSFCH related with the third PSSCH, after transmitting the first HARQ feedback to the first UE, the fourth UE may transmit the second HARQ feedback to the second UE.

For example, the fourth UE may perform any two PSFCH transmissions (i.e., the pre-configured maximum number of transmissions) in three PSFCH transmissions (PSFCH transmission related with the first PSSCH, PSFCH transmission related with the second PSSCH, PSFCH transmission related with the third PSSCH), and the fourth UE may not perform the remaining one PSFCH transmission.

For example, when the sum of transmission power required to perform PSFCH transmission by the pre-configured maximum number of transmissions is greater than the maximum transmission power value of the fourth UE, the transmission power of the fourth UE may be limited. In this case, for example, the fourth UE may omit transmission of one PSFCH. For example, the fourth UE may omit transmission related to the lowest priority PSFCH among the three PSFCH transmissions. For example, until the sum of the transmission power required to perform PSFCH transmission by the pre-configured maximum number of transmissions is less than or equal to the maximum transmission power value of the fourth UE, the fourth UE may omit the PSFCH transmission having a low priority (e.g., the PSFCH transmission related with the third PSSCH).

Figure 16:
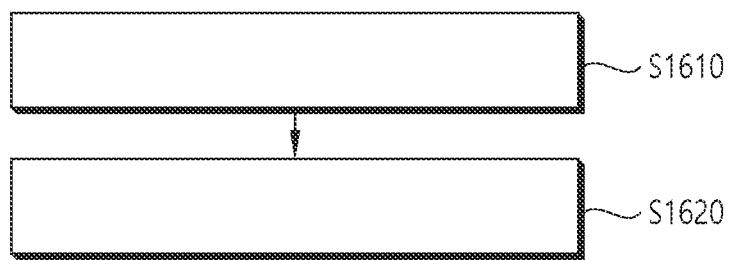
FIG. 16 shows a method for the first device 100 to transmit HARQ feedback through at least one PSFCH, in accordance with an embodiment of the present disclosure.

FIG. 16 shows a method for the first device 100 to transmit HARQ feedback through at least one PSFCH, in accordance with an embodiment of the present disclosure. The embodiment of FIG. 16 may be combined with various embodiments of the present disclosure.

Referring to FIG. 16, in step S1610, the first device 100 may perform sidelink reception through a plurality of physical sidelink control channels (PSCCHs) or a plurality of physical sidelink shared channels (PSSCHs). For example, the first device 100 may receive a plurality of sidelink information from a plurality of different devices through a plurality of PSCCHs or a plurality of PSSCHs.

In step S1620, the first device 100 may transmit a hybrid automatic repeat request (HARQ) feedback through at least one physical sidelink feedback channel (PSFCH) related to the plurality of PSCCHs or the plurality of PSSCHs. For example, the priority of the at least one PSFCH may be determined differently. For example, the first device 100 may determine the priority of at least one PSFCH differently. For example, the first device 100 may determine the priority of the plurality of PSFCHs related to the plurality of first PSCCHs or the plurality of first PSSCHs. For example, the first device 100 may transmit the HARQ feedback through the at least one PSFCH among the plurality of PSFCHs based on the priority of the plurality of PSFCHs.

For example, the first device 100 may transmit a plurality of PSCCHs or a plurality of PSSCHs. For example, the first device 100 may transmit a plurality of PSCCHs or a plurality of PSSCHs to another device. For example, the first device 100 may determine priorities of a plurality of second PSCCHs or a plurality of PSFCHs related to the plurality of second PSSCHs. For example, based on the priorities of the plurality of first PSFCHs and the priorities of the plurality of second PSFCHs, the first device 100 may select whether to perform transmission related to the first PSFCH or to perform reception related to the second PSFCH. For example, the first device 100 may perform HARQ feedback based on the selection. For example, the first device 100 may receive the HARQ feedback through at least one PSFCH among the plurality of PSFCHs based on the priority of the plurality of PSFCHs, based on the selection.

For example, the priority of the at least one PSFCH may be determined differently based on acknowledgment (ACK) information or negative-acknowledgement (NACK) information included in the at least one PSFCH. For example, the first device 100 may determine the priority of the at least one PSFCH differently based on ACK information or NACK information included in the at least one PSFCH.

For example, the priority of the at least one PSFCH may be determined differently based on the amount of HARQ feedback included in the at least one PSFCH. For example, the first device 100 may differently determine the priority of the at least one PSFCH based on the amount of HARQ feedback included in the at least one PSFCH.

For example, the priority of the at least one PSFCH may be determined differently based on a reference signal received power (RSRP) value measured by the first device 100. For example, the first device 100 may determine the priority of the at least one PSFCH differently based on a reference signal received power (RSRP) value measured by the first device 100. For example, the RSRP value may be measured based on a reference signal (RS) on a PSSCH related to the at least one PSFCH.

For example, the priority of the at least one PSFCH may be determined differently based on the number of retransmissions of the PSSCH related to the at least one PSFCH. For example, the first device 100 may determine the priority of the at least one PSFCH differently based on the number of retransmissions of the PSSCH related to the at least one PSFCH. For example, the first device 100 may determine the priority of the at least one PSFCH differently based on the number of retransmissions related to the transport block. For example, a transport block may be related with the at least one PSFCH.

For example, the priority of the at least one PSFCH may be determined differently based on a cast type of a PSSCH related to the at least one PSFCH. For example, the first device 100 may differently determine the priority of the at least one PSFCH based on a cast type of a PSSCH related to the at least one PSFCH.

For example, the priority of the at least one PSFCH may be determined differently based on HARQ feedback options related to the at least one PSFCH. For example, the first device 100 may determine the priority of the at least one PSFCH differently based on HARQ feedback options related to the at least one PSFCH. For example, the HARQ feedback options may include a first option and a second option. For example, the first option may be a method of transmitting only NACK based on failure of PSSCH reception. For example, the second option may be a method of transmitting ACK or NACK based on whether PSSCH reception is successful. For example, the priority of the PSFCH related with the first option may be higher than the priority of the PSFCH related with the second option. For example, the first device 100 may determine that the priority of the PSFCH related with the first option is higher than the priority of the PSFCH related with the second option. For example, the first device 100 may determine that a priority of a PSFCH through which NACK information related to the first option is transmitted is higher than a priority of a PSFCH related to the second option.

For example, the first device 100 may simultaneously transmit HARQ feedback transmitted through the at least one first PSFCH. For example, the first device 100 may omit HARQ feedback through at least one PSFCH having a lower priority among the PSFCHs related to the plurality of PSSCHs. For example, the first device 100 may omit HARQ feedback through at least one PSFCH having a lower priority than a pre-configured priority among PSFCHs related to the plurality of PSSCHs. For example, the first device 100 may simultaneously transmit the remaining HARQ feedback in the form of frequency division multiplexing (FDM).

For example, the first device 100 may transmit the HARQ feedback through at least one PSFCH having a higher priority than a pre-configured priority among the PSFCHs related to the plurality of PSSCHs. For example, based on that the number of HARQ feedback is greater than the maximum number of transmissions (e.g., the maximum number of transmissions that can be supported by the capability of the first device 100), the first device 100 may transmit at least one HARQ feedback through at least one PSFCH related to the plurality of PSSCHs in the order of higher priority.

For example, based on the fact that the number of HARQ feedback is greater than the maximum number of transmissions that can be supported by the capability of the first device 100, the first device 100 may transmit at least one HARQ feedback through at least one PSFCH related to the plurality of PSSCHs in the order of higher priority.

For example, based on the fact that the sum of power required to transmit the at least one HARQ feedback by a number less than or equal to the maximum number of transmissions supported by the capability of the first device 100 is greater than the maximum power of the first device 100, the first device may omit at least one HARQ feedback transmitted through at least one PSFCH having a lower priority until the sum of the required power becomes smaller than the maximum power of the first device 100. For example, based on a power value required to transmit the remaining one HARQ feedback among at least one HARQ feedback transmitted through the at least one first PSFCH is greater than the maximum transmission power of the first device 100, the first device 100 may transmit the remaining one HARQ feedback using the remaining available transmission power.

The above-described embodiment may be applied to various devices to be described below. First, for example, the processor 102 of the first device 100 may control the transceiver 106 to perform sidelink reception through a plurality of PSCCHs or a plurality of PSSCHs. And, for example, the processor 102 of the first device 100 may determine the priority of the plurality of PSFCHs related to the plurality of first PSCCHs or the plurality of first PSSCHs. And, for example, the processor 102 of the first device 100 may control the transceiver 106 to transmit the HARQ feedback through at least one PSFCH among the plurality of PSFCHs based on the priority of the plurality of PSFCHs.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive a plurality of first physical sidelink control channels (PSCCHs) or a plurality of first physical sidelink shared channels (PSSCHs) and determine priorities of a plurality of first physical sidelink feedback channels (PSFCHs) related to the plurality of first PSCCHs or the plurality of first PSSCHs and transmit a hybrid automatic repeat request (HARQ) feedback through at least one first PSFCH among the plurality of first PSFCHs based on the priorities of the plurality of first PSFCHs.

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive a plurality of first physical sidelink control channels (PSCCHs) or a plurality of first physical sidelink shared channels (PSSCHs) and determine priorities of a plurality of first physical sidelink feedback channels (PSFCHs) related to the plurality of first PSCCHs or the plurality of first PSSCHs and transmit a hybrid automatic repeat request (HARQ) feedback through at least one first PSFCH among the plurality of first PSFCHs based on the priorities of the plurality of first PSFCHs.

According to an embodiment of the present disclosure, a non-transitory computer-readable storage medium storing instructions may be provided. For example, the instructions, when executed, cause a first device to: receive a plurality of first physical sidelink control channels (PSCCHs) or a plurality of first physical sidelink shared channels (PSSCHs) and determine priorities of a plurality of first physical sidelink feedback channels (PSFCHs) related to the plurality of first PSCCHs or the plurality of first PSSCHs and transmit a hybrid automatic repeat request (HARQ) feedback through at least one first PSFCH among the plurality of first PSFCHs based on the priorities of the plurality of first PSFCHs.

Figure 17:
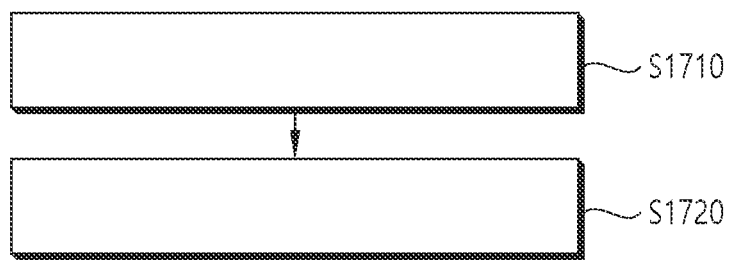
FIG. 17 shows a method in which the second device 200 receives HARQ feedback from the first device 100 through a PSFCH, in accordance with an embodiment of the present disclosure.

FIG. 17 shows a method in which the second device 200 receives HARQ feedback from the first device 100 through a PSFCH, in accordance with an embodiment of the present disclosure. The embodiment of FIG. 17 may be combined with various embodiments of the present disclosure.

Referring to FIG. 17, in step S1710, the second device 200 may perform sidelink transmission to the first device 100 through a physical sidelink control channel (PSCCH) or a physical sidelink shared channel (PSSCH). For example, the second device 200 may transmit sidelink information to the first device 100 through a PSCCH or a PSSCH.

In step S1720, the second device 200 may receive a hybrid automatic repeat request (HARQ) feedback from the first device 100 through a physical sidelink feedback channel (PSFCH) related to the PSCCH or the PSSCH. For example, when there are a plurality of PSCCHs or PSSCHs received by the first device 100, priorities of the plurality of PSFCHs related with each of the plurality of PSCCHs or the plurality of PSSCHs may be determined differently. For example, the priority of the plurality of PSFCHs may be determined differently by the first device 100.

For example, the priorities of the plurality of PSFCHs may be determined differently based on acknowledgment (ACK) information or negative-acknowledgement (NACK) information included in the PSFCH. For example, the priorities of the plurality of PSFCHs may be determined differently based on the amount of HARQ feedback included in the PSFCH. For example, the priorities of the plurality of PSFCHs may be determined differently based on a reference signal received power (RSRP) value measured by the first device 100. For example, the RSRP value may be measured based on a reference signal on a PSSCH related to the PSFCH.

For example, the priorities of the plurality of PSFCHs may be determined differently based on the number of retransmissions of a PSSCH related to the PSFCH. For example, the priorities of the plurality of PSFCHs may be determined differently based on a cast type of a PSSCH related to the PSFCH.

For example, the priorities of the plurality of PSFCHs may be determined differently based on HARQ feedback options related to the PSFCH. For example, the HARQ feedback options may include a first option and a second option. For example, the first option may be a method of transmitting only NACK based on failure of PSSCH reception. For example, the second option may be a method of transmitting ACK or NACK based on whether PSSCH reception is successful. For example, the priority of the PSFCH related with the first option may be higher than the priority of the PSFCH related with the second option.

The above-described embodiment may be applied to various devices to be described below. For example, the processor 202 of the second device 200 may control the transceiver 206 to perform sidelink transmission to the first device 100 through a PSCCH or a PSSCH. And, the processor 202 of the second device 200 may control the transceiver 206 to receive a HARQ feedback from the first device 100 through a PSFCH related to the PSCCH or the PSSCH.

According to an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: perform sidelink transmission to a first device through a physical sidelink control channel (PSCCH) or a physical sidelink shared channel (PSSCH) and receive a hybrid automatic repeat request (HARQ) feedback from the first device through a physical sidelink feedback channel (PSFCH) related to the PSCCH or the PSSCH. For example, a priority of the PSFCH related with each of the plurality of PSSCHs is determined differently based on the plurality of PSSCHs received by the first device.

Meanwhile, For example, while UE A receives a PSSCH and/or a PSCCH (from UE B) on one or more slots, UE A may receive a PSFCH from UE C in another frequency resource domain. Alternatively, for example, while UE A receives a PSSCH and/or a PSCCH (from UE B) on one or more slots, UE C may transmit a PSFCH to UE D in another frequency resource domain. In this case, although the PSFCH transmitted from the UE C to the UE D is not subject to reception/decoding from the UE A side, the PSFCH transmitted by the UE C may affect the reception power of the PSSCH and/or the PSCCH that the UE A intends to receive.

In the above case, due to the PSFCH transmitted from the UE C to the UE A or the PSFCH transmitted from the UE C to the UE D, the power at which the UE A receives the PSSCH and/or the PSCCH may be changed. For example, due to in-band emission caused by the PSSCH and/or the PSCCH and frequency division multiplexing (FDM) PSFCH, the power at which UE A receives the PSSCH and/or the PSCCH may be changed. For example, FDM PSFCH may mean a PSFCH on which FDM was performed. If the reception power of the PSSCH and/or the PSCCH is changed, a problem in that the automatic gain control (AGC) value (previously) assumed/measured by the UE A to receive the PSSCH and/or the PSCCH becomes inaccurate may occur.

Figure 18:
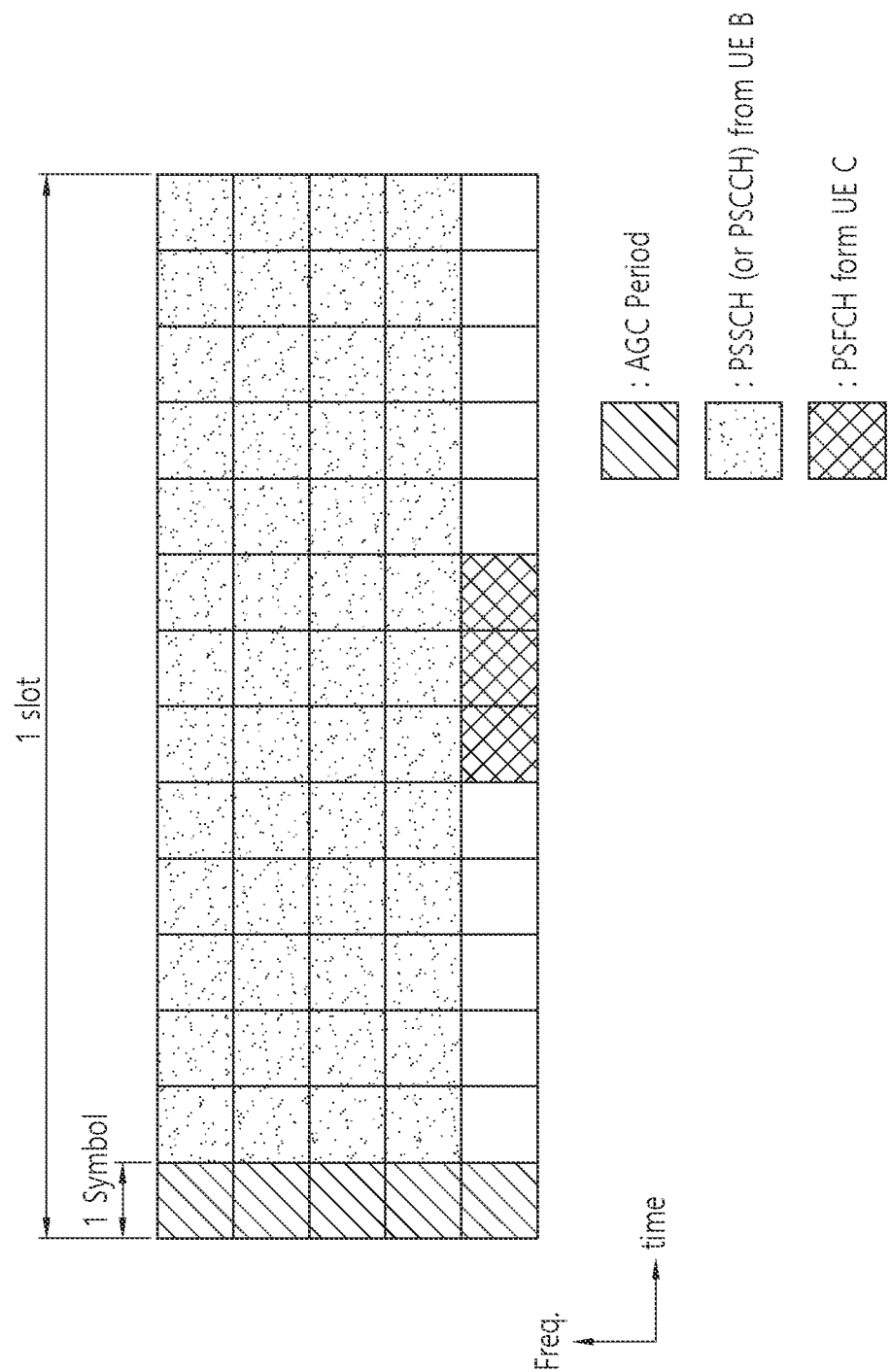
FIG. 18 shows an example in which the PSFCH affects the PSSCH and/or the PSCCH reception power of UE A.

FIG. 18 shows an example in which the PSFCH affects the PSSCH and/or the PSCCH reception power of UE A. The embodiment of FIG. 18 may be combined with various embodiments of the present disclosure.

Referring to FIG. 18, the number of symbols used by UE B to transmit the PSSCH and/or the PSCCH to UE A may be greater than the number of symbols used by UE C to transmit the PSFCH. In addition, while PSSCH and/or PSCCH transmission and PSFCH transmission all overlap in the time domain, they may not overlap in the frequency domain. In this case, due to the PSFCH transmitted from the UE C, the PSSCH and/or the PSCCH reception power of the UE A may be changed, and there may be a problem in that the automatic gain control (AGC) value (previously) assumed/measured for the UE A to receive the PSSCH and/or the PSCCH is inaccurate.

Figure 19:
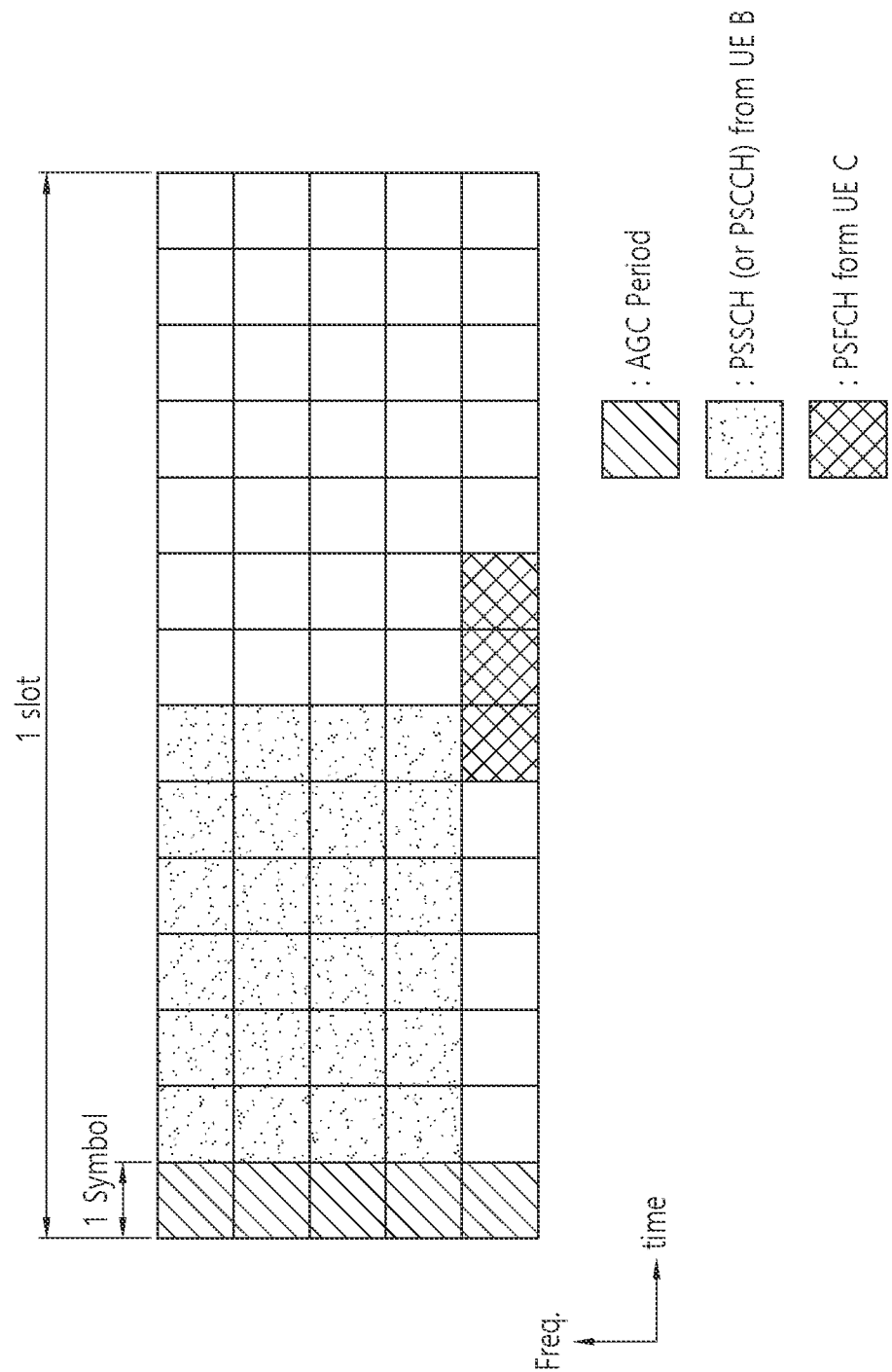
FIG. 19 shows an example in which the PSFCH affects the PSSCH and/or the PSCCH reception power of UE A in accordance with an embodiment of the present disclosure

FIG. 19 shows an example in which the PSFCH affects the PSSCH and/or the PSCCH reception power of UE A in accordance with an embodiment of the present disclosure. The embodiment of FIG. 19 may be combined with various embodiments of the present disclosure.

Referring to FIG. 19, the number of symbols used by UE B to transmit the PSSCH and/or the PSCCH to UE A may be greater than the number of symbols used by UE C to transmit PSFCH. And, while PSSCH and/or PSCCH transmission and PSFCH transmission partially overlap in the time domain, they may not overlap in the frequency domain. For example, a rear symbol of PSSCH and/or PSCCH transmission may overlap a PSFCH transmission symbol. In this case, due to the PSFCH transmitted from the UE C, the PSSCH and/or the PSCCH reception power of the UE A may be changed, there may be a problem in that the automatic gain control (AGC) value (previously) assumed/measured for the UE A to receive the PSSCH and/or the PSCCH is inaccurate.

Further, in the example situation described above, the distance between UE A and UE B transmitting the PSSCH and/or the PSCCH may be different from the distance between UE A and UE C transmitting the PSFCH. That is, UE B and UE C may be located at different distances from UE A. For example, as the difference between the distance between UE B and UE A and the distance between UE C and UE A increases, the problem of inaccurate automatic gain control (AGC) values (previously) assumed/measured by UE A to receive the PSSCH and/or the PSCCH may become (probably) more serious. Accordingly, there may be a problem that UE A needs to perform additional AGC in order to receive the PSSCH and/or the PSCCH.

In order to alleviate/solve the above problems, a method for a UE to transmit the PSFCH, the PSSCH and/or the PSCCH and an apparatus supporting the same according to an embodiment of the present disclosure will be described below.

Figure 20:
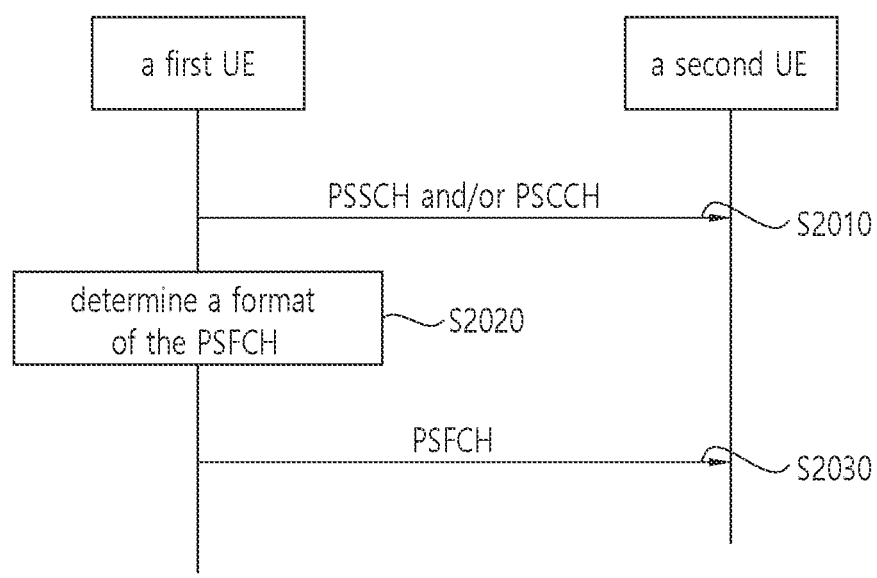
FIG. 20 shows a method for a UE to transmit feedback on sidelink data or sidelink control information, in accordance with an embodiment of the present disclosure.

FIG. 20 shows a method for a UE to transmit feedback on sidelink data or sidelink control information, in accordance with an embodiment of the present disclosure. The embodiment of FIG. 20 may be combined with various embodiments of the present disclosure.

Referring to FIG. 20, in step S2010, the first UE may receive sidelink data or sidelink control information from the second UE. For example, sidelink data or sidelink control information may be received using a PSSCH and/or a PSCCH.

In step S2020, the first UE may determine a format of the PSFCH for transmitting feedback on sidelink data or sidelink control information.

According to an embodiment of the present disclosure, when the first UE transmits only the PSFCH, the first UE may determine to use a predefined LONG PSFCH format. Herein, for example, the LONG PSFCH format may be a PSFCH format transmitted using all symbols on a (pre-configured) slot. Alternatively, for example, the LONG PSFCH format may be a PSFCH format transmitted using symbols except for some/specific symbols (e.g., the last symbol on a slot designated for TX-RX SWITCHING TIME usage) among all symbols on a (pre-configured) slot. Herein, for example, the first UE may implement the LONG PSFCH format in the form of filling the slot by repeatedly transmitting/mapping a SHORT PSFCH format. For example, when the UE transmits only the PSSCH and/or the PSCCH on a slot, the number of symbols used for transmission of the LONG PSFCH format may be the same as the number of symbols used for transmission of the PSSCH and/or the PSCCH. An example in which the UE maps/transmits the LONG PSFCH format may refer to FIG. 21.

According to an embodiment of the present disclosure, when the first UE transmits the PSSCH and/or the PSCCH and the PSFCH (together in TDM form), the first UE may determine to use the SHORT PSFCH format. For example, the SHORT PSFCH format may be a PSFCH format transmitted using only some symbols on a (pre-configured) slot. Alternatively, for example, the SHORT PSFCH format may be a PSFCH format transmitted using only symbols of a specific position (e.g., a rear symbol on a slot). For example, when the UE transmits only the PSSCH and/or the PSCCH on a slot, the number of symbols used for transmission (in TDM format) of PSSCH and/or PSCCH and PSFCH may be the same as the number of symbols used for transmission of the PSSCH and/or the PSCCH. An example in which the UE maps/transmits the SHORT PSFCH format may refer to FIG. 22.

Figure 21:
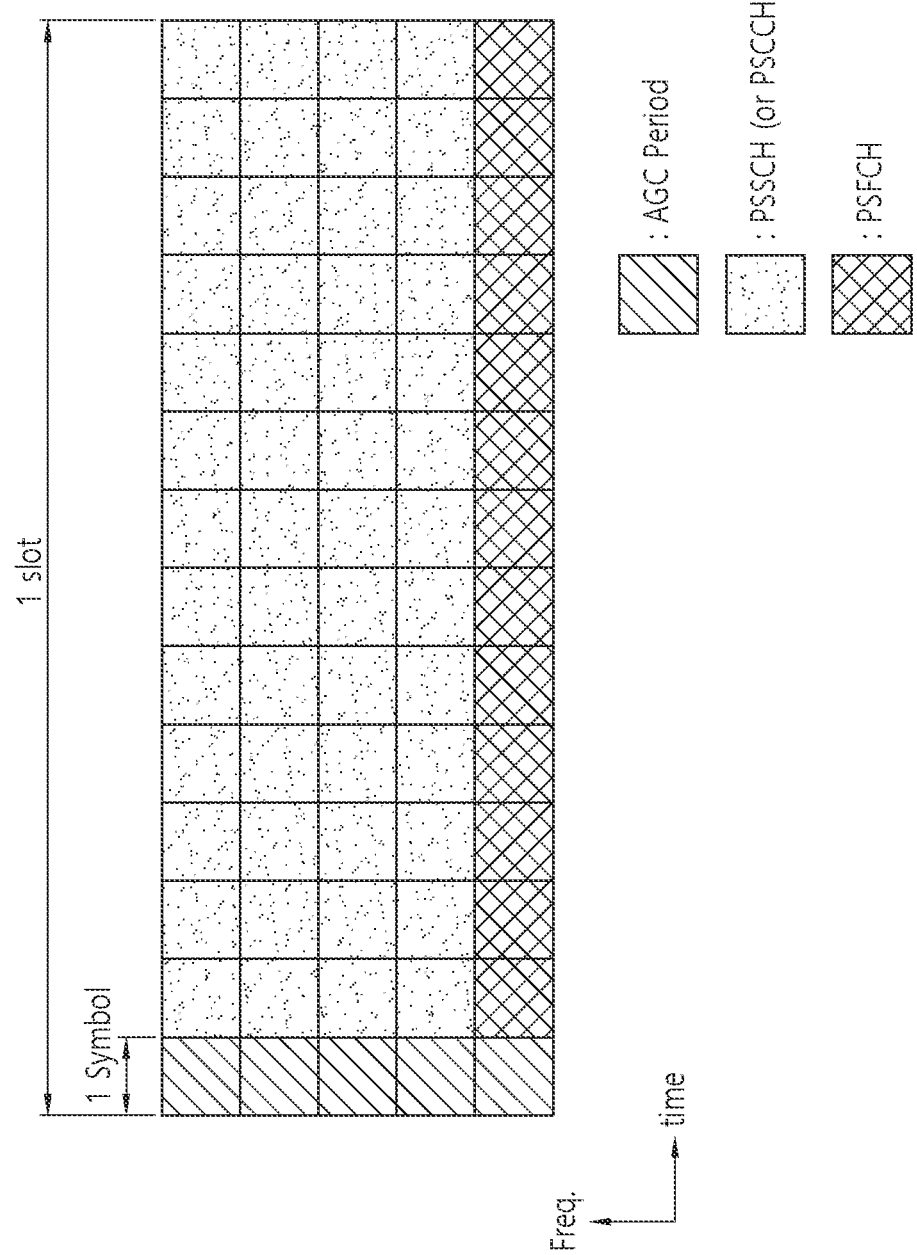
FIG. 21 shows an example of mapping/allocating a LONG PSFCH format by a first UE, in accordance with an embodiment of the present disclosure.

FIG. 21 shows an example of mapping/allocating a LONG PSFCH format by a first UE, in accordance with an embodiment of the present disclosure. The embodiment of FIG. 21 may be combined with various embodiments of the present disclosure.

Referring to FIG. 21, the number of symbols used for transmission of the LONG PSFCH format may be the same as the number of symbols used for transmission of the PSSCH and/or the PSCCH.

Figure 22:
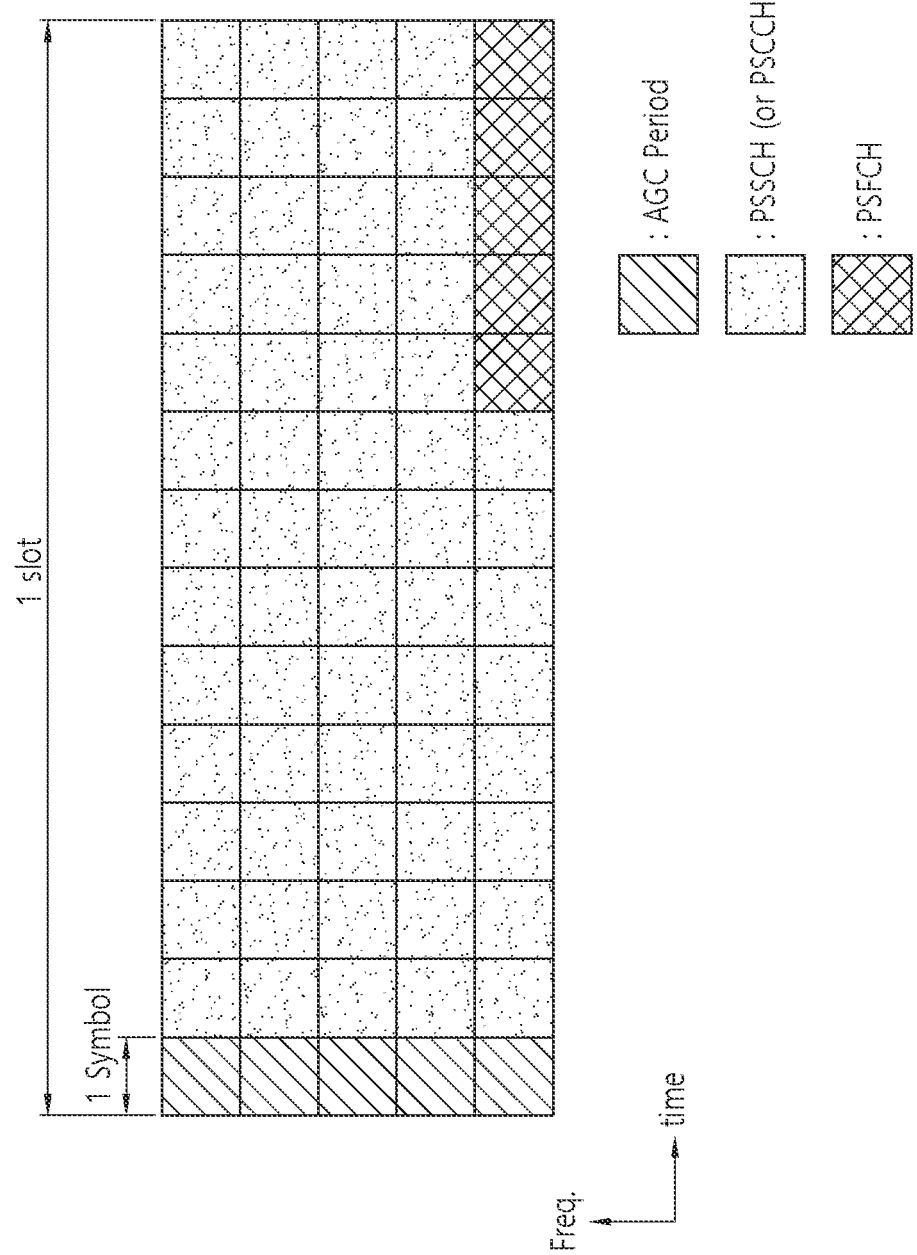
FIG. 22 shows an example in which the first UE maps/allocates PSSCH and/or PSCCH and SHORT PSFCH formats in a TDM in accordance with an embodiment of the present disclosure.

FIG. 22 shows an example in which the first UE maps/allocates PSSCH and/or PSCCH and SHORT PSFCH formats in a TDM in accordance with an embodiment of the present disclosure. The embodiment of FIG. 22 may be combined with various embodiments of the present disclosure.

Referring to FIG. 22, the number of symbols used for (TDM) transmission of the PSSCH and/or the PSCCH and SHORT PSFCH may be the same as the number of symbols used for transmission of the PSSCH and/or the PSCCH.

Referring back to FIG. 20, in step S2030, the first UE may transmit feedback on sidelink data or sidelink control information to the second UE using the SHORT PSFCH format or the LONG PSFCH format. For example, the feedback may be HARQ ACK or HARQ NACK. For example, the feedback may be transmitted through the PSFCH.

According to an embodiment of the present disclosure, a problem in which the PSSCH and/or PSCCH reception power of the second UE is changed due to in-band emission caused by the PSFCH can be solved/relieved. Therefore, due to the in-band emission caused by the PSFCH, it is possible to solve the problem that the second UE performs additional AGC to receive the PSSCH and/or the PSCCH.

Figure 23:
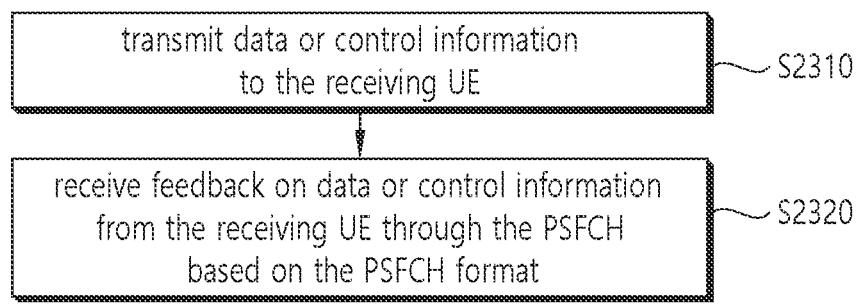
FIG. 23 shows a method for a UE to transmit feedback on sidelink data or sidelink control information, in accordance with an embodiment of the present disclosure.

FIG. 23 shows a method for a UE to transmit feedback on sidelink data or sidelink control information, in accordance with an embodiment of the present disclosure. The embodiment of FIG. 23 may be combined with various embodiments of the present disclosure.

Referring to FIG. 23, in step S2310, the transmitting UE may transmit data or control information to the receiving UE. In step S2320, the transmitting UE may receive feedback on data or control information from the receiving UE through the PSFCH based on the PSFCH format. For example, the PSFCH format may be a LONG PSFCH format or a SHORT PSFCH format.

The above-described embodiment may be applied to various devices to be described below. First, the processor 102 of the transmitting UE 100 may control the transceiver 106 of the transmitting UE 100 to transmit data or control information to the receiving UE 200. And, the processor 102 of the transmitting UE 100 may control the transceiver 106 of the transmitting UE 100 to receive a PSFCH feedback on data or control information from the receiving UE 200 based on the PSFCH format.

Figure 24:
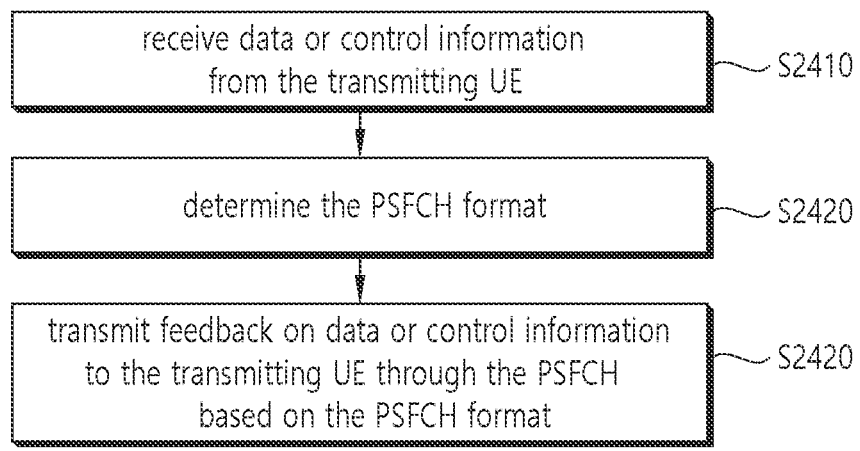
FIG. 24 shows a method for a receiving terminal to transmit sidelink feedback information in accordance with an embodiment of the present disclosure.

FIG. 24 shows a method for a receiving terminal to transmit sidelink feedback information in accordance with an embodiment of the present disclosure. The embodiment of FIG. 24 may be combined with various embodiments of the present disclosure.

Referring to FIG. 24, in step S2410, the receiving UE may receive data or control information from the transmitting UE. In step S2420, the receiving UE may determine the PSFCH format. In step S2430, the receiving UE may transmit feedback on data or control information to the transmitting UE through the PSFCH based on the PSFCH format. For example, the PSFCH format may be a LONG PSFCH format or a SHORT PSFCH format.

The above-described embodiment may be applied to various devices to be described below. First, the processor 202 of the receiving UE 200 may control the transceiver 206 of the receiving UE 200 to receive data or control information from the transmitting UE 100. And, the processor 202 of the receiving UE 200 may determine the PSFCH format. And, the processor 202 of the receiving UE 200 may control the transceiver 206 of the receiving UE 200 to transmit feedback on data or control information to the transmitting UE 100 through the PSFCH based on the PSFCH format.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 25:
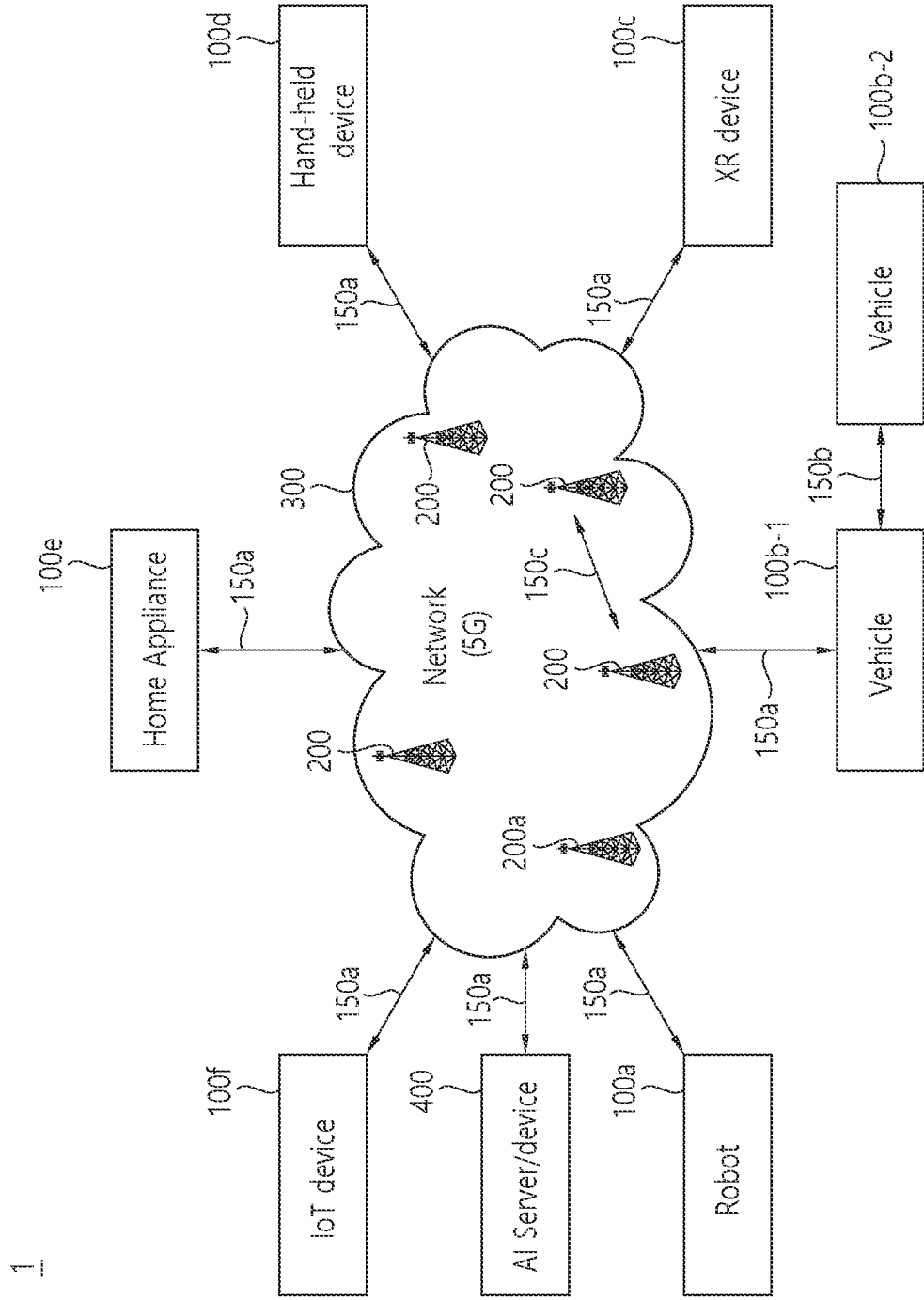
FIG. 25 shows a communication system 1, in accordance with an embodiment of the present disclosure.

FIG. 25 shows a communication system 1, in accordance with an embodiment of the present disclosure.

Referring to FIG. 25, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 26:
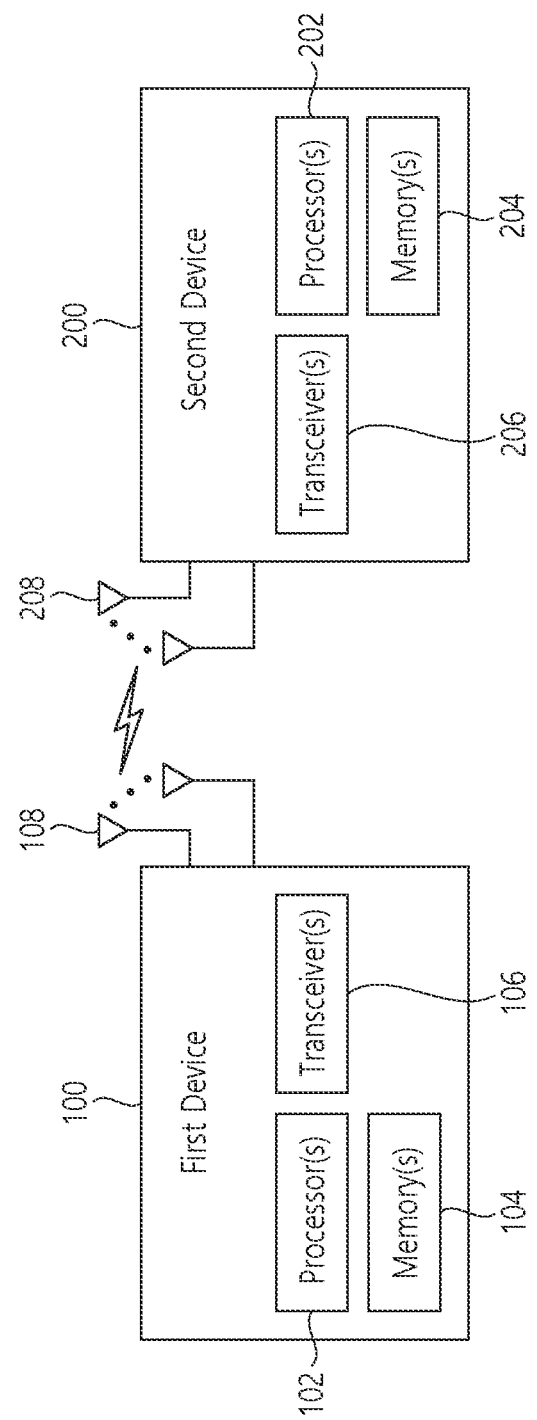
FIG. 26 shows wireless devices, in accordance with an embodiment of the present disclosure.

FIG. 26 shows wireless devices, in accordance with an embodiment of the present disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 25.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor (s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 27:
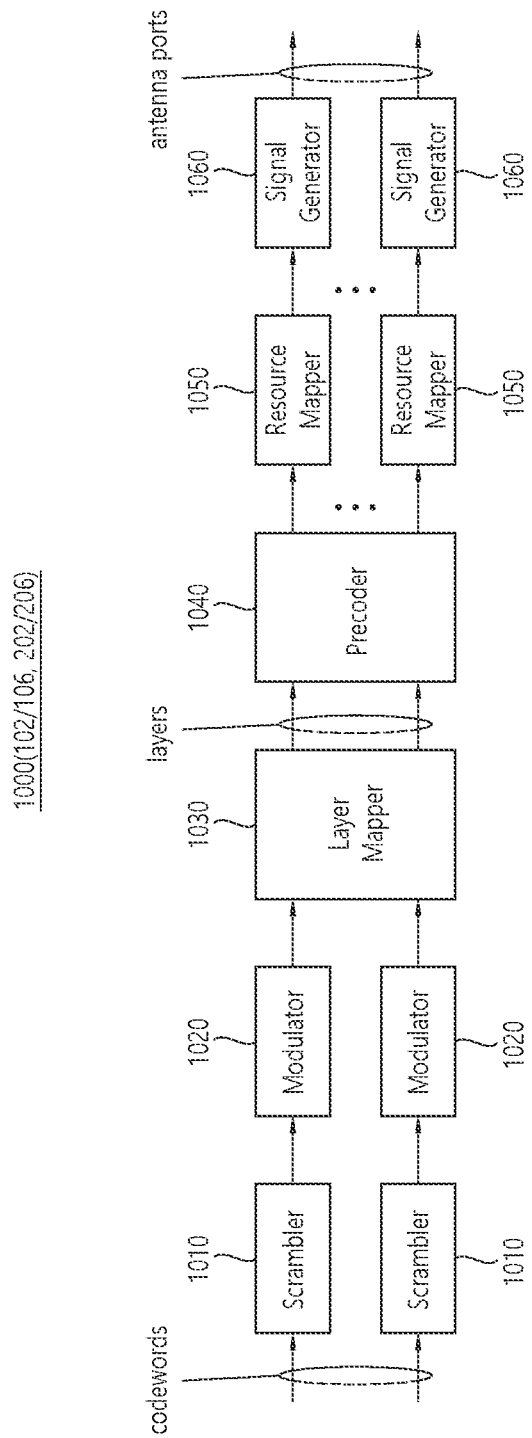
FIG. 27 shows a signal process circuit for a transmission signal, in accordance with an embodiment of the present disclosure.

FIG. 27 shows a signal process circuit for a transmission signal, in accordance with an embodiment of the present disclosure.

Referring to FIG. 27, a signal processing circuit 1000 may include scramblers 1010, modulators 1020, a layer mapper 1030, a precoder 1040, resource mappers 1050, and signal generators 1060. An operation/function of FIG. 27 may be performed, without being limited to, the processors 102 and 202 and/or the transceivers 106 and 206 of FIG. 26. Hardware elements of FIG. 27 may be implemented by the processors 102 and 202 and/or the transceivers 106 and 206 of FIG. 26. For example, blocks 1010 to 1060 may be implemented by the processors 102 and 202 of FIG. 26. Alternatively, the blocks 1010 to 1050 may be implemented by the processors 102 and 202 of FIG. 26 and the block 1060 may be implemented by the transceivers 106 and 206 of FIG. 26.

Codewords may be converted into radio signals via the signal processing circuit 1000 of FIG. 27. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 27. For example, the wireless devices (e.g., 100 and 200 of FIG. 26) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 28:
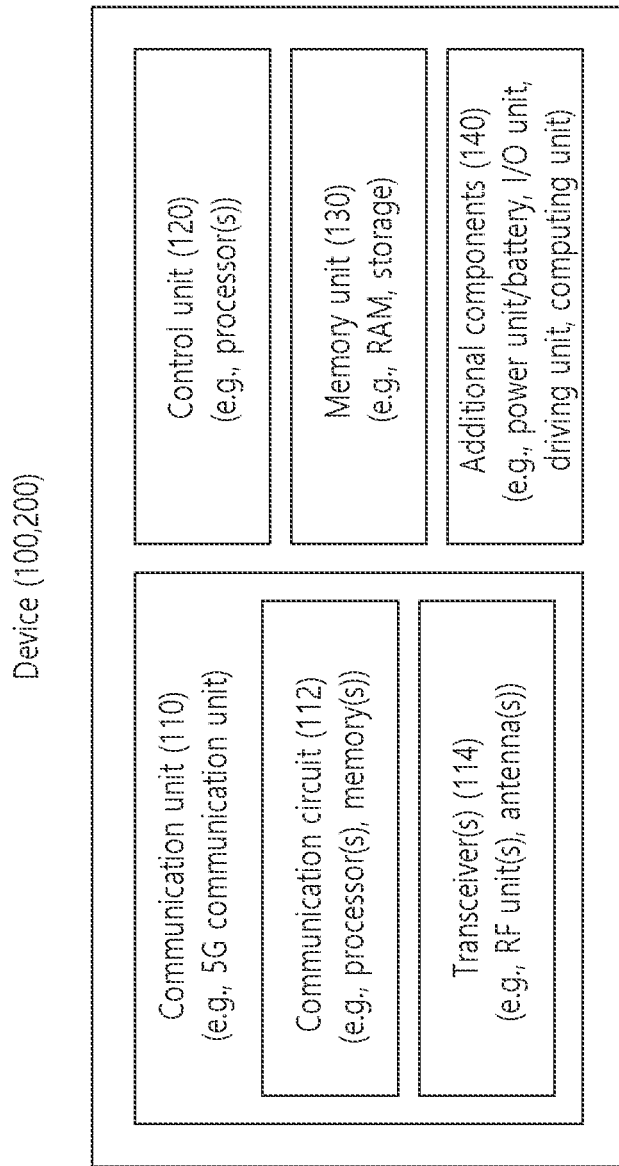
FIG. 28 shows a wireless device, in accordance with an embodiment of the present disclosure.

FIG. 28 shows another example of a wireless device, in accordance with an embodiment of the present disclosure. The wireless device may be implemented in various forms according to a use-case/service (refer to FIG. 25).

Referring to FIG. 28, wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 25), the vehicles (100b-1 and 100b-2 of FIG. 25), the XR device (100c of FIG. 25), the hand-held device (100d of FIG. 25), the home appliance (100e of FIG. 25), the IoT device (100f of FIG. 25), a digital broadcast terminal, a hologram device, a public safety device, an MTC device, a medicine device, a fintech device (or a finance device), a security device, a climate/environment device, the AI server/device (400 of FIG. 25), the BSs (200 of FIG. 25), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 28 will be described in detail with reference to the drawings.

Figure 29:
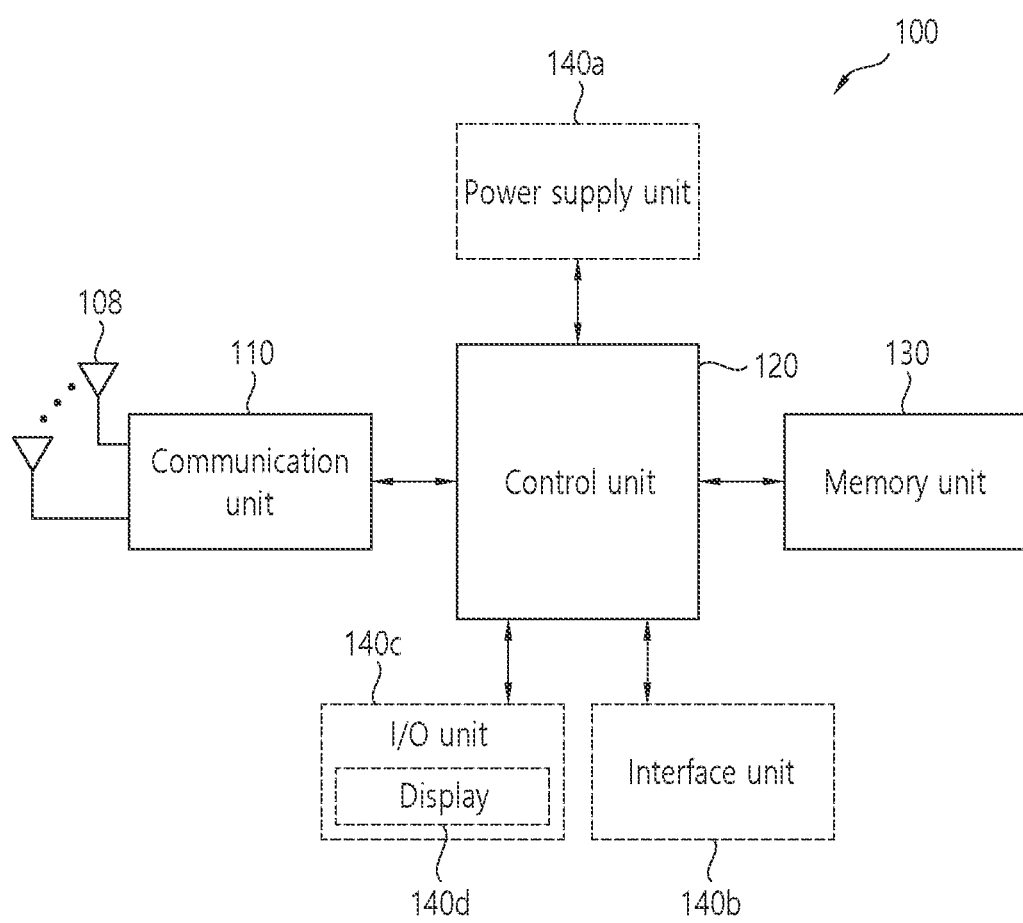
FIG. 29 shows a hand-held device, in accordance with an embodiment of the present disclosure.

FIG. 29 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 29, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 28, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 30:
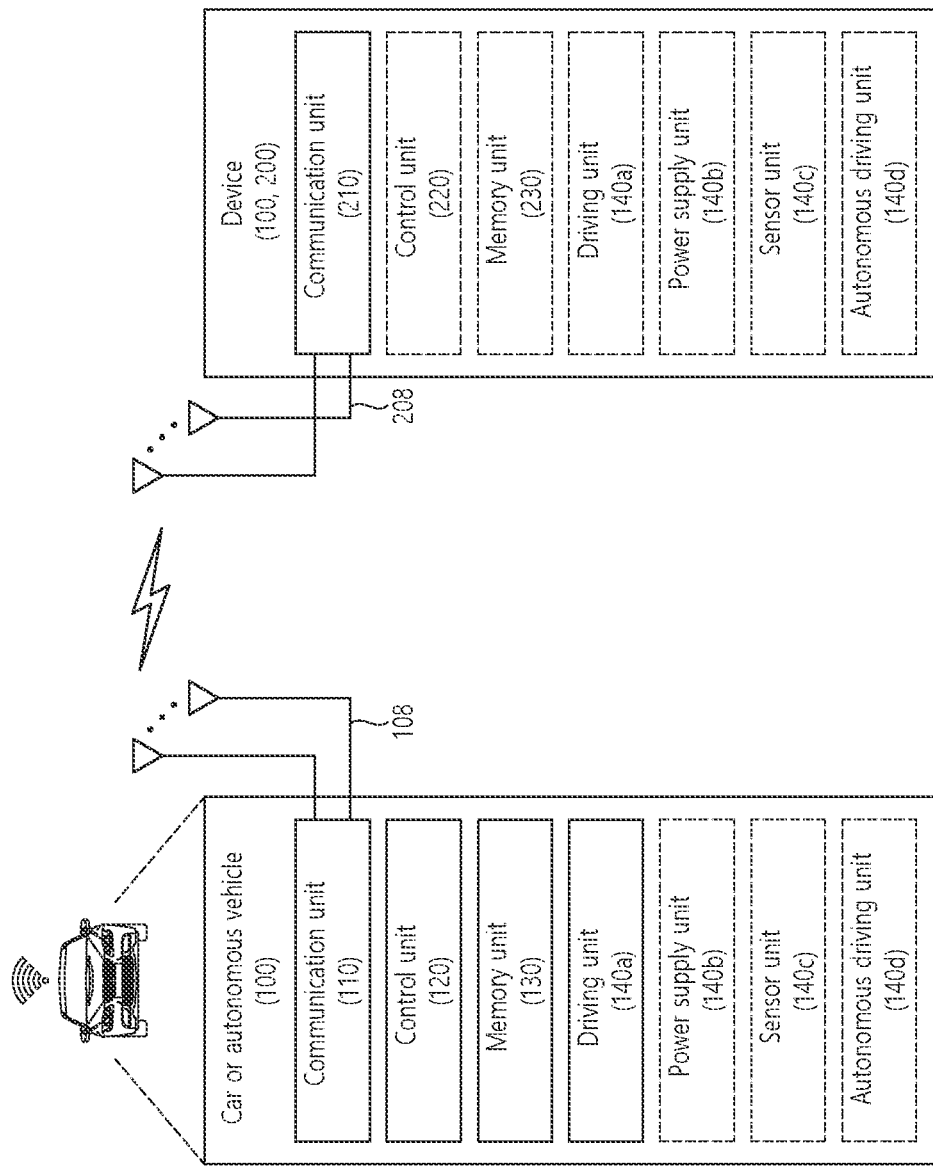
FIG. 30 shows a car or an autonomous vehicle, in accordance with an embodiment of the present disclosure.

FIG. 30 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 30, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 28, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
    receiving, on a first physical sidelink control channel (PSCCH), first sidelink control information (SCI) for scheduling a first physical sidelink shared channel (PSSCH) and second SCI;
    receiving, on the first PSSCH, the second SCI;
    transmitting, on a second PSCCH, third SCI for scheduling a second PSSCH and fourth SCI; and
    transmitting, on the second PSSCH, the fourth SCI,
    wherein a first physical sidelink feedback channel (PSFCH) is related to the first PSSCH,
    wherein a second PSFCH is related to the second PSSCH, and
    wherein, based on that a transmission of the first PSFCH would overlap in time with a reception of the second PSFCH, the first PSFCH is transmitted based on that the first PSFCH is with hybrid automatic repeat request-acknowledgement (HARQ-ACK) information and the second PSFCH does not provide HARQ-ACK information.

2. The method of claim 1,
    wherein, the first PSFCH is first transmitted, based on that N scheduled transmission (TX) PSFCHs including the first PSFCH in a PSFCH transmission resource would be transmitted, and based on that the first PSFCH is with the HARQ-ACK information and the second PSFCH does not provide the HARQ-ACK information.

3. The method of claim 2,
    wherein a priority for the first PSFCH with the HARQ-ACK information is equal to a priority included in the first SCI.

4. The method of claim 3,
    wherein the first PSFCH is first transmitted, based on that the N scheduled TX PSFCHs including the first PSFCH in the PSFCH transmission resource would be transmitted, based on that the first PSFCH is with the HARQ-ACK information and the second PSFCH does not provide the HARQ-ACK information, and based on that the first PSFCH with the HARQ-ACK information is related to a highest priority from priorities of the N scheduled TX PSFCHs.

5. The method of claim 2,
wherein the PSFCH transmission resource is a PSFCH transmission resource related to a time domain of the PSFCH transmission resource.

6. The method of claim 1,
wherein, based on that the transmission of the first PSFCH would overlap in time with the reception of the second PSFCH, the second PSFCH is received based on that the second PSFCH is with HARQ-ACK information and the first PSFCH does not provide HARQ-ACK information.

7. The method of claim 1,
wherein, based on that the transmission of the first PSFCH would overlap in time with the reception of the second PSFCH, the first PSFCH is transmitted or the second PSFCH is received only based on at least one of a priority for the first PSFCH or a priority for the second PSFCH is related to a highest priority from both the first PSFCH and the second PSFCH, and based on that both of the first PSFCH is related to the PSFCH with the HARQ-ACK information and the second PSFCH is related to the PSFCH with the HARQ-ACK information.

8. The method of claim 7,
wherein the priority for the first PSFCH is equal to a priority included in the first SCI, and
wherein the priority for the second PSFCH is equal to a priority included in the third SCI.

9. The method of claim 1,
wherein a priority for the first PSFCH is related to whether the first PSFCH is with first option or second option,
wherein the first option is that PSFCH transmits either acknowledgement (ACK) or negative acknowledgement (NACK), and
wherein the second option is that PSFCH transmits the NACK or no physical feedback channel signal is transmitted.

10. The method of claim 9,
wherein a priority for PSFCH related to the second option is higher than a priority for the PSFCH related to the first option.

11. The method of claim 1,
wherein the transmission of first PSFCH is skipped, based on that N scheduled transmission (TX) PSFCHs in a PSFCH transmission resource would be transmitted, and based on that the first PSFCH does not provide the HARQ-ACK information.

12. A first device comprising:
at least one transceiver;
at least one processor; and
at least one memory connected to the at least one processor and storing instructions that, based on being executed, cause the first device to perform operations comprising:
receiving, on a first physical sidelink control channel (PSCCH), first sidelink control information (SCI) for scheduling a first physical sidelink shared channel (PSSCH) and second SCI;
receiving, on the first PSSCH, the second SCI;
transmitting, on a second PSCCH, third SCI for scheduling a second PSSCH and fourth SCI; and
transmitting, on the second PSSCH, the fourth SCI,
wherein a first physical sidelink feedback channel (PSFCH) is related to the first PSSCH,
wherein a second PSFCH is related to the second PSSCH, and
wherein, based on that a transmission of the first PSFCH would overlap in time with a reception of the second PSFCH, the first PSFCH is transmitted based on that the first PSFCH is with hybrid automatic repeat request-acknowledgement (HARQ-ACK) information and the second PSFCH does not provide HARQ-ACK information.

13. A processing device comprising:
at least one processor; and
at least one memory connected to the at least one processor and storing instructions that, based on being executed, cause a first device to perform operations comprising:
receiving, on a first physical sidelink control channel (PSCCH), first sidelink control information (SCI) for scheduling a first physical sidelink shared channel (PSSCH) and second SCI;
receiving, on the first PSSCH, the second SCI; and
transmitting, on a second PSCCH, third SCI for scheduling a second PSSCH and fourth SCI; and
transmitting, on the second PSSCH, the fourth SCI,
wherein a first physical sidelink feedback channel (PSFCH) is related to the first PSSCH in a PSFCH transmission resource,
wherein a second PSFCH is related to the second PSSCH, and
wherein, based on that a transmission of the first PSFCH would overlap in time with a reception of the second PSFCH, the first PSFCH is transmitted based on that the first PSFCH is with hybrid automatic repeat request-acknowledgement (HARQ-ACK) information and the second PSFCH does not provide HARQ-ACK information.

* * * * *